(12) United States Patent
Akizuki et al.

(10) Patent No.: US 7,958,338 B2
(45) Date of Patent: Jun. 7, 2011

(54) INSTRUCTION EXECUTION CONTROL DEVICE AND INSTRUCTION EXECUTION CONTROL METHOD

(75) Inventors: Yasunobu Akizuki, Kawasaki (JP);
Toshio Yoshida, Kawasaki (JP);
Tomohiro Tanaka, Kawasaki (JP);
Ryuji Kan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/591,993

(22) Filed: Dec. 7, 2009

(65) Prior Publication Data
US 2010/0095103 A1    Apr. 15, 2010

Related U.S. Application Data

(63) Continuation of application No. PCT/JP2007/000652, filed on Jun. 20, 2007.

(51) Int. Cl.
*G06F 9/38* (2006.01)
*G06F 9/52* (2006.01)
(52) U.S. Cl. ........................ 712/217; 712/216
(58) Field of Classification Search .................. 712/217, 712/216
See application file for complete search history.

(56) References Cited

U.S. PATENT DOCUMENTS

| | | | |
|---|---|---|---|
| 5,778,243 A | | 7/1998 | Aipperspach et al. |
| 5,802,339 A | * | 9/1998 | Sowadsky et al. ............ 712/217 |
| 5,872,963 A | * | 2/1999 | Bitar et al. .................... 712/233 |
| 7,509,511 B1 | * | 3/2009 | Barowski et al. ............. 713/320 |
| 2002/0095614 A1 | * | 7/2002 | Rodgers et al. ............... 713/500 |
| 2004/0073781 A1 | | 4/2004 | Hokenek et al. |
| 2006/0020776 A1 | | 1/2006 | Yoshida |
| 2006/0026594 A1 | | 2/2006 | Yoshida et al. |
| 2006/0161421 A1 | * | 7/2006 | Kissell ........................... 703/26 |
| 2007/0067612 A1 | | 3/2007 | Kan et al. |
| 2008/0040589 A1 | | 2/2008 | Sakamoto et al. |

FOREIGN PATENT DOCUMENTS

| | | |
|---|---|---|
| EP | 1622000 A2 | 2/2006 |
| JP | 3646137 | 5/2005 |
| JP | 2006-502504 | 1/2006 |
| JP | 2006-39815 | 2/2006 |
| JP | 2006-40141 | 2/2006 |
| JP | 2007-87108 | 4/2007 |
| JP | 2007-109057 | 4/2007 |
| WO | 2004/034209 | 4/2004 |
| WO | WO-2004/034340 A2 | 4/2004 |
| WO | WO-2006/114874 A1 | 11/2006 |

OTHER PUBLICATIONS

International Search Report for PCT/JP2007/000652, mailed Sep. 4, 2007.
Extended European Search Report dated Dec. 7, 2010 for corresponding European Application No. 07790178.3.

* cited by examiner

*Primary Examiner* — Daniel Pan
(74) *Attorney, Agent, or Firm* — Fujitsu Patent Center

(57) ABSTRACT

An instruction execution control device operates a plurality of threads in a simultaneous multi-thread system. The device has architecture registers (22-0, 22-1) for each thread, and a selection circuit (32, 24) which, when an operand data required for executing a function is read from a register file (20), selects in advance a thread to be read from the register file (20). This makes it possible to select an architecture register at an early stage, and although the number of circuits in a portion for selecting the architecture registers increases, the wiring amount of the circuits can be decreased, because the architecture register of the thread to be read is selected in advance.

18 Claims, 16 Drawing Sheets

INSTRUCTION EXECUTION CONTROL DEVICE AND INSTRUCTION EXECUTION CONTROL METHOD

CROSS REFERENCE TO RELATED APPLICATIONS

This application is a continuation of International Application No. PCT/JP2007/000652, filed on Jun. 20, 2007, now pending, herein incorporated by reference.

TECHNICAL FIELD

The present invention relates to an instruction execution control device and an instruction execution control method in which a plurality of threads operate in a simultaneous multi-thread system and instruction control is executed in an out-of-order processing, and more particularly to an instruction execution control device and an instruction execution control method for controlling reading of a register file which operates in a simultaneous multi-thread system.

BACKGROUND ART

Higher speed processing is demanded for a CPU (Central Processing Unit). And for this, the processing of a CPU has been improved using various technologies. The methods used for this purpose are pipeline processing, a superscalar system which performs parallel processing, and an out-of-order execution system which executes instructions having completed input data with priority, without executing according to the sequence assigned to the program instructions.

The out-of-order execution system is a technology to improve performance of a CPU by executing the subsequent instruction first when data required for the first instruction is not completed and data required for the subsequent instruction processing is completed (e.g. see Patent Document 1).

For example, in the case of the processing instructions in the sequence written in a program, if a first instruction processing 1 is an instruction involving memory access, and a subsequent instruction processing 2 is an instruction which does not involve memory access, then the instruction 2 is executed in parallel with the memory access of the instruction processing 1, and the instruction processing 1 is executed after executing the instruction processing 2.

Another multi-thread system for improving processing of a CPU by allowing not a single program, but a plurality of programs to run, has been proposed (e.g. see Patent Document 2).

In this multi-thread system of allowing a plurality of programs to run, by providing a plurality of sets of programmable resources a CPU, it is equivalent to operate a plurality of CPUs when viewed from a software point of view. Therefore a plurality of programs can be executed.

FIG. 16 is a block diagram of a conventional CPU. The CPU has a main storage 111, instruction cache 112, instruction decoder 113, reservation station 114, computing execution unit 115 and architecture register 116. This reservation station 114 reads operand data required for executing functions from the architecture register 116, and controls computing processing of the computing execution unit 115 and main storage operand address generation processing.

The architecture register 116 temporarily stores operand data, and is required to have a read/write speed equivalent to the computing speed as a part of the CPU. Therefore the architecture register 116 is constructed not by memories but by huge registers. For example, the architecture register 116 is constructed by register files that can be installed at high density by a fewer number of transistors.

One example of this multi-thread system is a VMT (Vertical Multi-Threading) system. According to this system, only one program can run at a time, but programs can be switched when a long wait time for data is generated, or when a predetermined interval time elapses. For the circuit amount used for a VMT system, programmable resources are provided for the number of programs, but the circuit amount to be added to run one program is little, which is easily implemented.

In the case of FIG. 16, the register file 116 is constructed by an architecture register for each thread, and one architecture register is set to "active", and the other architecture register is set to "sleep" according to the switching of the programs, and operand data is read from an architecture register corresponding to the running program.

Another example of a multi-thread system is a simultaneous multi-thread system (SMT system) which allows a plurality of programs to run simultaneously. Since a plurality of programs run simultaneously, circuit control becomes more difficult and resources increase, compared with the case of allowing a single program to run, but circuits can be efficiently used since a plurality of programs run at the same time.

In the case of this simultaneous multi-thread system as well, architecture registers for a plurality of threads are constructed by register files, and operand data of a corresponding thread is read from these architecture registers for the plurality of threads.

Patent Document 1: Japanese Patent Application Laid-Open No. 2007-87108
Patent Document 2: Published Japanese Translation of PCT application No. 2006-502504 (WO 2004/034209)

As described above, in the case of the simultaneous multi-thread system, architecture registers for a plurality of threads are constructed by register files, and a plurality of programs are allowed to run simultaneously, hence the circuit amount to select the architecture registers increases in order to read operand data required for executing functions, compared with the a single thread system. Also wiring amount of the circuits may increase when operand data in different threads are read simultaneously.

Therefore, compared with the case of a single thread, it is difficult to improve read frequency of the register file. This means that improving performance of a CPU to increase computing speed is difficult, even if the out-of-order system and simultaneous multi-thread system are used.

DISCLOSURE OF THE INVENTION

With the foregoing in view, it is an object of the present invention to provide an instruction execution control device and an instruction execution control method for reading operand data required for executing the function at high-speed, from a register file constituting the architecture registers in a plurality of threads in simultaneous multi-thread processing.

It is another object of the present invention to provide an instruction execution control device and instruction execution control method to minimize an increase in circuit amount and wiring amount for reading from a register file, even if architecture registers for a plurality of threads are constructed in the register file.

It is still another object of the present invention to provide an instruction execution control device and instruction execution control method to minimize an increase in circuit amount and writing amount for reading from a register file and improving frequency of simultaneous multi-thread processing, even if architecture registers for a plurality of threads are constructed in the register file.

MEANS FOR SOLVING THE SUBJECT

In order to attain the above objects, this invention provides an instruction execution control device, including: a reservation station for controlling a computing processing for processing out-of-order execution and controlling main storage operand address generation; a register update buffer for storing data acquired by execution of a function; a register file having an architecture register for each thread, and a read thread selection circuit for limiting the number of threads that can be read simultaneously, to the number of threads less than the number of threads of the architecture registers; and a thread selection circuit which, when operand data is read from the register file by executing an entry in the reservation station, selects a read thread of the entry before the entry is executed and controls the read thread selection circuit. And the operand data is read from an architecture register of the thread selected by the thread selection circuit when the entry is computed or operand generation is executed.

Further, this invention provides an instruction execution control method, including: a step of controlling, using a reservation station, a computing unit and a main storage operand generator to process an out-of-order execution; a step of storing data acquired by the execution to a register update buffer which is not observed by a program; a step of selecting a read thread of an entry of the reservation station before executing the entry when operand data is read from the register file by executing the entry by the reservation station; a step of selecting, using the read thread, a register file having an architecture register for each thread of a simultaneous multi-thread system and a read thread selection circuit for limiting the number of threads that can be read simultaneously to the number of threads less than the number of threads of the architecture registers; and a step of reading operand data from the architecture register of the thread selected by the thread selection circuit when the entry is computed or operand generation is executed.

Also in the present invention, it is preferable that the reservation station does not limit the number of threads that can be read simultaneously when reading the operand data required for computing and generating an operand address from the register update buffer or from an immediate value.

Also in the present invention, it is preferable that the reservation station stores the operand data in the register update buffer into the architecture register when the instruction executed from the reservation station is completed by storing data acquired by executing an instruction by the entry of the reservation station into the register update buffer.

Also in the present invention, it is preferable that the reservation station judges whether or not the entry in the reservation station requires to read the operand data from the register file and also judges whether or not the thread of this entry matches the thread of the entry selected by the thread selection circuit, and selects, for the execution, the entry which requires to read data from the register file and of which thread matches with the thread of the entry selected by the thread selection circuit.

Also in the present invention, it is preferable that the reservation station selects, based on the judgment, an entry which can read operand data required for execution of a function from the register update buffer or can use an immediate value, as an entry to be executed regardless the thread of the entry.

Also in the present invention, it is preferable that the thread selection circuit detects that a thread that can be read from the register file is limited to a specific thread, and selects the specific thread.

Also in the present invention, it is preferable that the thread selection circuit detects that a thread that can be read from the register file need not be limited to a specific thread, and prohibits a selection of a thread which is not operating, using a signal to indicate a thread which is operating.

Also in the present invention, it is preferable that the thread selection circuit detects that a thread that can be read from the register file need not be limited to a specific thread, and judges whether or not a thread in operation which cannot execute any of the entries in the reservation station exists, and prohibits the thread selection of the thread which cannot issue any entry if it is decided that the thread exists, and if another thread in operation which can issue an entry exists.

Also in the present invention, it is preferable that the thread selection circuit detects that a thread that can be read from the register file need not be limited to a specific thread, and judges whether or not an instruction which cannot be completed for a predetermined period exists in entries in the reservation station, and selects the entry of the thread which is not completed at a predetermined interval if it is decided that the entry exists.

Also in the present invention, it is preferable that the thread selection circuit detects that a thread that can be read from the register file need not be limited to a specific thread, and selects a thread for which the time when this thread is not selected by the thread selection circuit, is longest.

EFFECTIVENESS OF THE INVENTION

When a plurality of threads are operated by the simultaneous multi-thread system, an architecture register is provided for each thread, and a thread to be read from the register file is selected in advance, to read operand data required for execution of the function from the register file, so the architecture register can be selected at an early stage. The number of circuit for selecting the architecture register increases, but the wiring amount of circuits can be decreased, because the architecture register of the thread to be read is selected in advance.

When operand data is read from a location other than the architecture registers by the entry of the reservation station, all the threads are simultaneously read, unlike the case of reading from the architecture register, without restrictions by the threads which are read simultaneously.

EXPLANATION OF LETTERS OR NUMERALS

1 INSTRUCTION FETCH ADDRESS GENERATOR
2 PRIMARY INSTRUCTION CACHE
3 INSTRUCTION BUFFER
4 INSTRUCTION DECODER
5, 6, 7, 8 RESERVATION STATION
10 OPERAND ADDRESS GENERATOR
12, 15 COMPUTING UNIT
13, 16 UPDATE BUFFER
14, 17 REGISTER
20 REGISTER FILE
20-0, 22-1 ARCHITECTURE REGISTER
24 READ THREAD SELECTION CIRCUIT
26 OPERAND DATA SELECTION CIRCUIT
32 THREAD SELECTION CIRCUIT
34 EXECUTION ENTRY SELECTION CIRCUIT
36 REGISTER READ ID BUFFER

EMBODIMENTS

Embodiments of the present invention will now be described with reference to the drawings, in the sequence of an information processing device, a general configuration of an instruction execution control device, an instruction execution control device, a thread selection circuit and other embodiments. The present invention, however, is not limited to the following embodiments, but can be modified in various ways.

(Information Processing Device)

Figure 1:
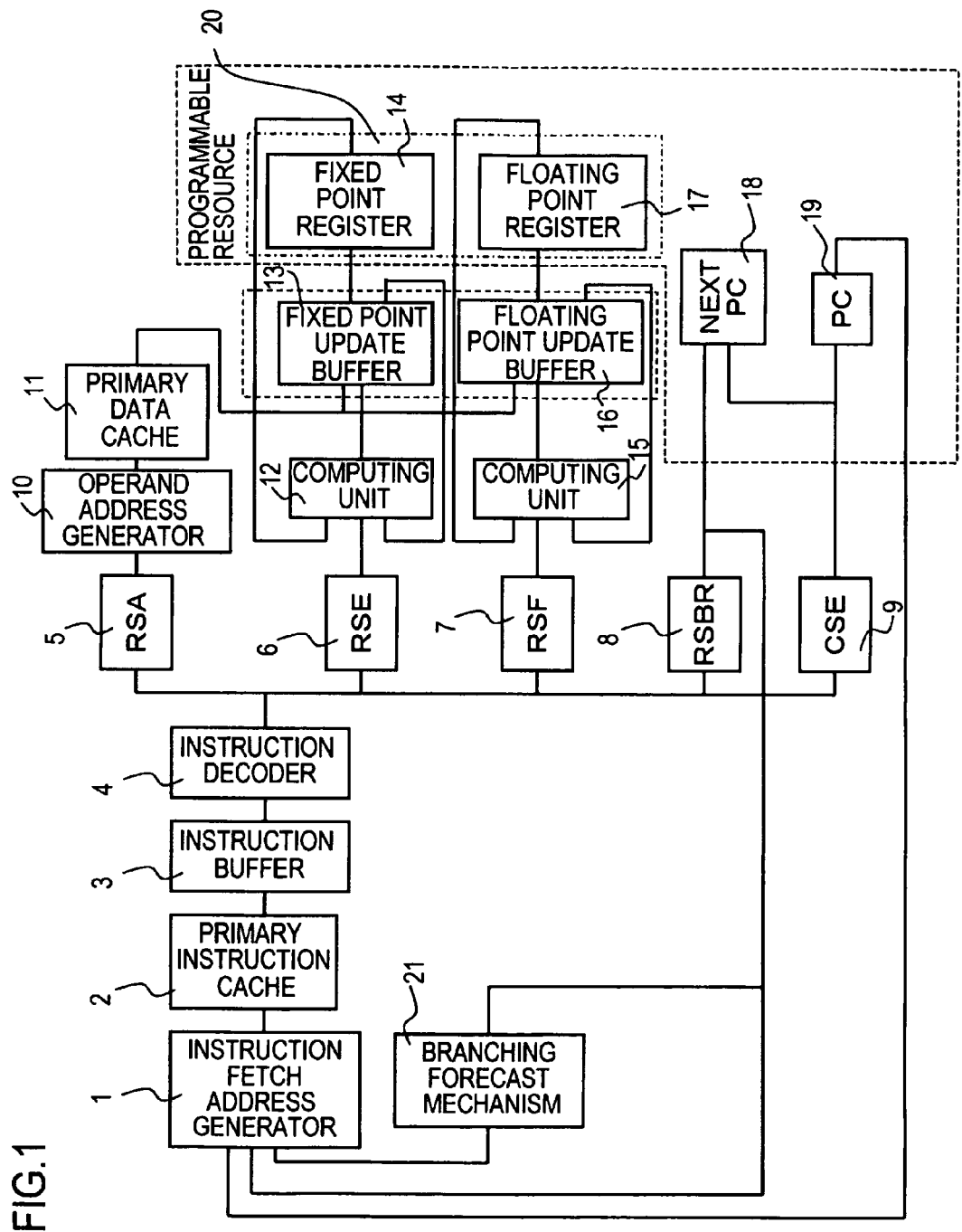
FIG. 1 is a block diagram depicting an embodiment of an information processing device according to the present invention.

FIG. 1 is an overview of an embodiment of an information processing device according to the present invention. As FIG. 1 depicts, a primary instruction cache 2 and a primary data cache 11 are connected to a secondary cache which is connected to a main storage, which is not illustrated.

In order to fetch instructions, an instruction fetch address generator 1 selects an instruction address, and sends an instruction fetch request for the selected instruction address to the primary instruction cache 2. The instruction fetched from the primary instruction cache 2 is stored in an instruction buffer 3. The stored instructions are supplied to an instruction decoder 4 in the execution sequence of the program from the instruction buffer 3.

The instruction decoder 4 decodes the instructions according to the execution sequence of the program. Depending on the type of the instruction to be decoded, the instruction decoder 4 creates a required entry for a reservation station unit for generating a main storage operand address (RSA: Reservation Station for Address generate) 5 which control execution of instructions, a reservation station unit for computing a fixed point (RSE: Reservation Station for Execute) 6, a reservation station unit for computing a floating point (RSF: Reservation Station for Floating) 7, and a reservation station unit for branch instruction (RSBR: Reservation Station for BRanch) 8.

In other words, the instruction decoder 4 decodes a fetched instruction in-order, and the decoded instruction is stored in the reservation station units 5, 6, 7, 8 and 9, which control the execution of functions respectively, depending on the type of instruction. A reservation station unit has reservation station units for computing 6 and 7, and reservation station unit 5 for generating a main storage operand address.

An entry is created in a commit stack entry (CSE: Commit Stack Entry) 9 for controlling completion of an instruction for all the decoded instructions.

If a decoded instruction is a load instruction, an entry is created in the RSA5, and the RSA5 instructs an operand address generator 10 to generate an operand address and reads the corresponding data from the primary data cache 11 to a fixed point update buffer (GUB: General Update Buffer) 13 and a floating point update buffer (FUB: Floating Update Buffer) 16, depending on the type of load instruction.

If the decoded instruction creates an entry in RSE6 and RSF7, each computing unit 12 and 15 is operated so as to execute corresponding computing processing. In the case when the decoded instruction creates an entry in the RSA5, RSE6 and RSF7, an out-of-order execution can be enabled by renaming a register corresponding to GUB13 and FUB16, and the execution result is stored in GUB13 and FUB16.

Instructions executed based on out-of-order processing by the reservation stations 5, 6 and 7 are completed according to the sequence of the program by the control of the CSE9. Programmable resources, such as a fixed point register 14, floating point register 17 and program counters (PC, NEXT_PC) 18 and 19, are updated only for the completed instructions.

A branching forecasting mechanism 21 forecasts branching by an instruction from the reservation for branching instruction 8, and controls the instruction fetch address generator 1.

Here a register file 20 is used for the fixed point register 14 and the floating point register 17 of the architecture registers, which are programmable resources provided for each thread, since there are many registers. But for the next program counter 18 and the program counter 19, which are programmable resources provided for each thread, a register file is not used since these are small registers.

As mentioned later, a thread is selected for each computing cycle by the reservation station units 5, 6, 7 and 8, execution of entry of the selected thread is instructed to the operand address generators 10 and computing units 12 and 15, and operand data of the thread selected from the register file 20 is read and written, whereby the simultaneous multi-thread processing is executed.

(General Configuration of Instruction Execution Control Device)

Figure 2:
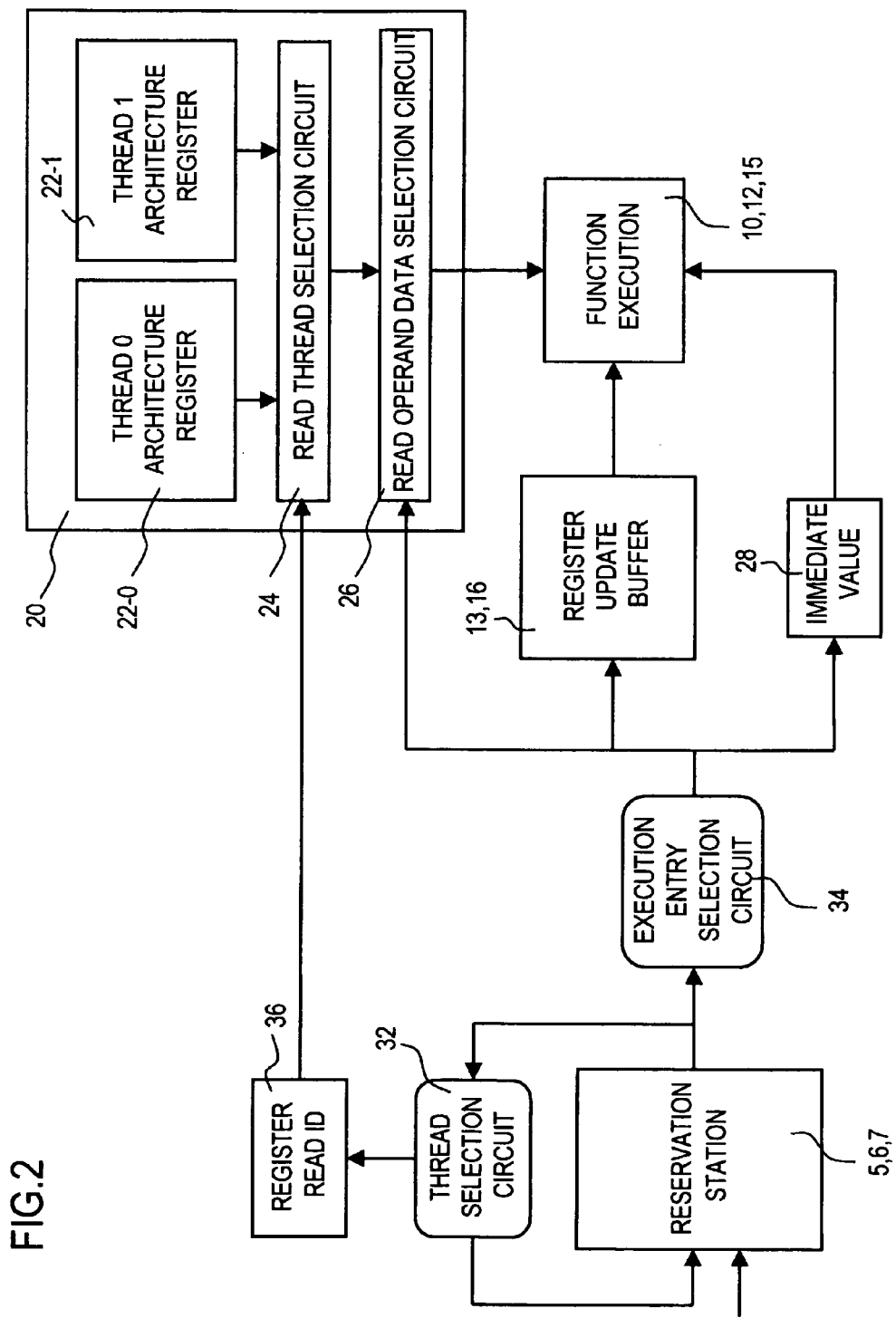
FIG. 2 is a block diagram depicting an embodiment of an instruction execution control device of the present invention.

FIG. 2 is a block diagram depicting an embodiment of the instruction execution control device of the present invention, where the RSE5, RSE6, RSF7 and register file 20 in FIG. 1 are depicted in detail.

In this embodiment, the case of two threads (threads 0 and 1) operating simultaneously is described, but the present invention can also be implemented even if the number of threads is three or more.

In FIG. 2, composing elements the same as FIG. 1 are denoted with a same symbol, and the reservation units 5, 6 and 7 are connected to a thread selection circuit 32 and an execution entry selection circuit 34.

The threads 0 and 1 are shared for the entries in the reservation station units 5, 6 and 7. In other words, an entry stores a thread ID to indicate a thread of the entry, a signal to instruct to read the operand data from the architecture register and the read address, a signal to instruct to read from the register update buffer and the read address, and an instruction identifier to indicate a number of an instruction to be allocated to each instruction when the instruction is decoded, for example.

The architecture registers 22-0 and 22-1 of the two threads are constructed by a register file 20 where threads, which can be read simultaneously and threads which can be written simultaneously, are integrated. The read thread and the write thread need not be the same.

As FIG. 2 depicts, the register file 20 is comprised of the architecture registers 22-0 and 22-1 of the threads 0 and 1, a read thread selection circuit 24 and a read operand selection circuit 26.

The thread selection circuit 32 selects a read thread, reads a read thread ID and sends it to the read thread selection circuit 24. The read thread selection circuit 24 selects the architecture register 22-0 and 22-1 of a thread indicated by the read thread ID. Then the read address included in the execution entry is sent from the execution entry selection circuit 34 to the read operand data selection circuit 26.

The read operand data selection circuit 26 reads data of a portion required for function execution circuits 10, 12 and 15 according to the read address, so as to be used for execution of a function. The execution entry selection circuit 34 selects an entry to be executed from the reservation station, reads data on the portion required for executing a function from the register file 20, register update buffers 13 and 16 and immediate value register 28, and executes the function.

This operation will now be described. When a plurality of threads run in a simultaneous multi-thread system, the entry configuration of the reservations 5, 6 and 7 are shared by the threads. The architecture register 22-0 or 22-1 is provided for each thread, and is constructed by the register file 20.

When the operand data required for executing a function is read from the register file 20, a thread to be read from the register file 20 is selected in advance using the register read ID of the thread selection circuit 32. Also the number of threads to be read is limited to the number of threads smaller than the number of threads of the architecture register 22-0 or 22-1.

Since the thread to be read is predetermined, the register file 20 can select the architecture register 22-0 or 22-1 at an early stage before the execution entry is selected by the execution entry selection circuit 34.

The circuits 24 of the portion to select the architecture register 22-0 or 22-1 increase, but the wiring amount of the circuits can be decreased because the architecture register of the thread to be read is already selected. When a function is executed, data required for the execution is selected by operand selection units 42 and 48, but if the architecture register of the thread to be read is not selected, the operand data for the amount of threads is sent from the architecture register to the operand selection units 42 and 48. By selecting the architecture register of the thread to be read in advance, the wiring amount to the operand selection units 42 and 48 can be decreased.

In this way, by predetermining a thread to be read from the register file 20, required operand data can be efficiently read from the register file 20, and conventional frequencies could be exceeded if a semiconductor superior to conventional semiconductor technology is used.

The thread selection circuit 32 selects a thread to be read from the register file 20 in advance. When the reservation stations to execute different functions, such as RSA5 and RSE6, read the operand data from a same register file 20, read control is performed by the thread selection circuit 24 in the register file 20, so a same thread is used when the operand data is read from the register file 20 in the entries executed by the reservation stations 5 and 6.

When the operand data is read from locations other than the architecture registers 22-0 and 22-1 by the entries of the reservation station units 5, 6 and 7, all the threads can be read simultaneously, unlike the case of reading data from the architecture registers.

In other words, the data other than the architecture registers 22-0 and 22-1, from which data is acquired in executing a function, are used the register update buffers 13 and 16 and the immediate value register 28 constructed by a work register, which are not observed by a program. When the data in these registers is used as operand data, the threads can be simultaneously read without restriction.

(Instruction Execution Control Device)

Figure 3:
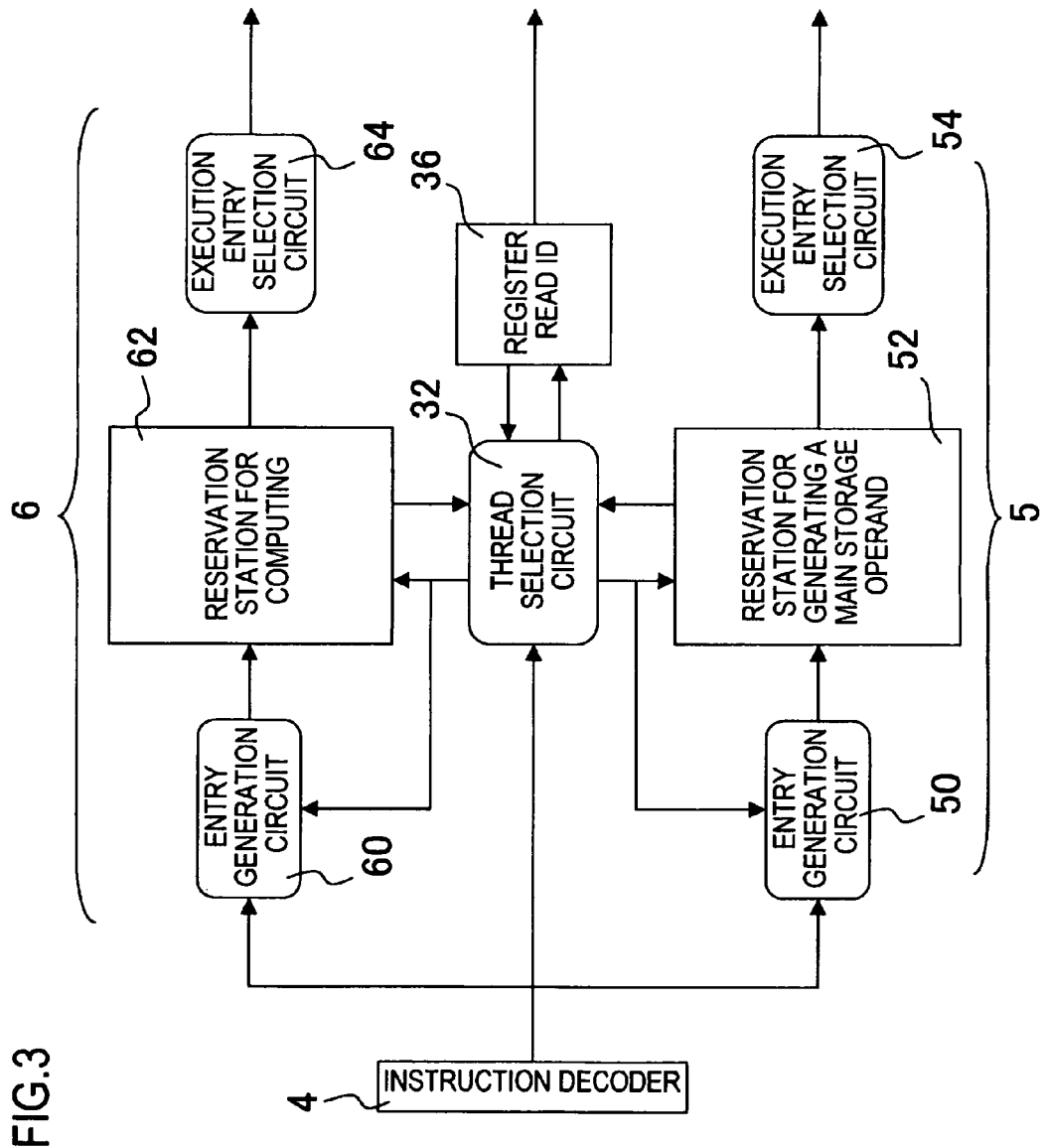
FIG. 3 is a detailed block diagram depicting the instruction execution control device in FIG. 2.
Figure 4:
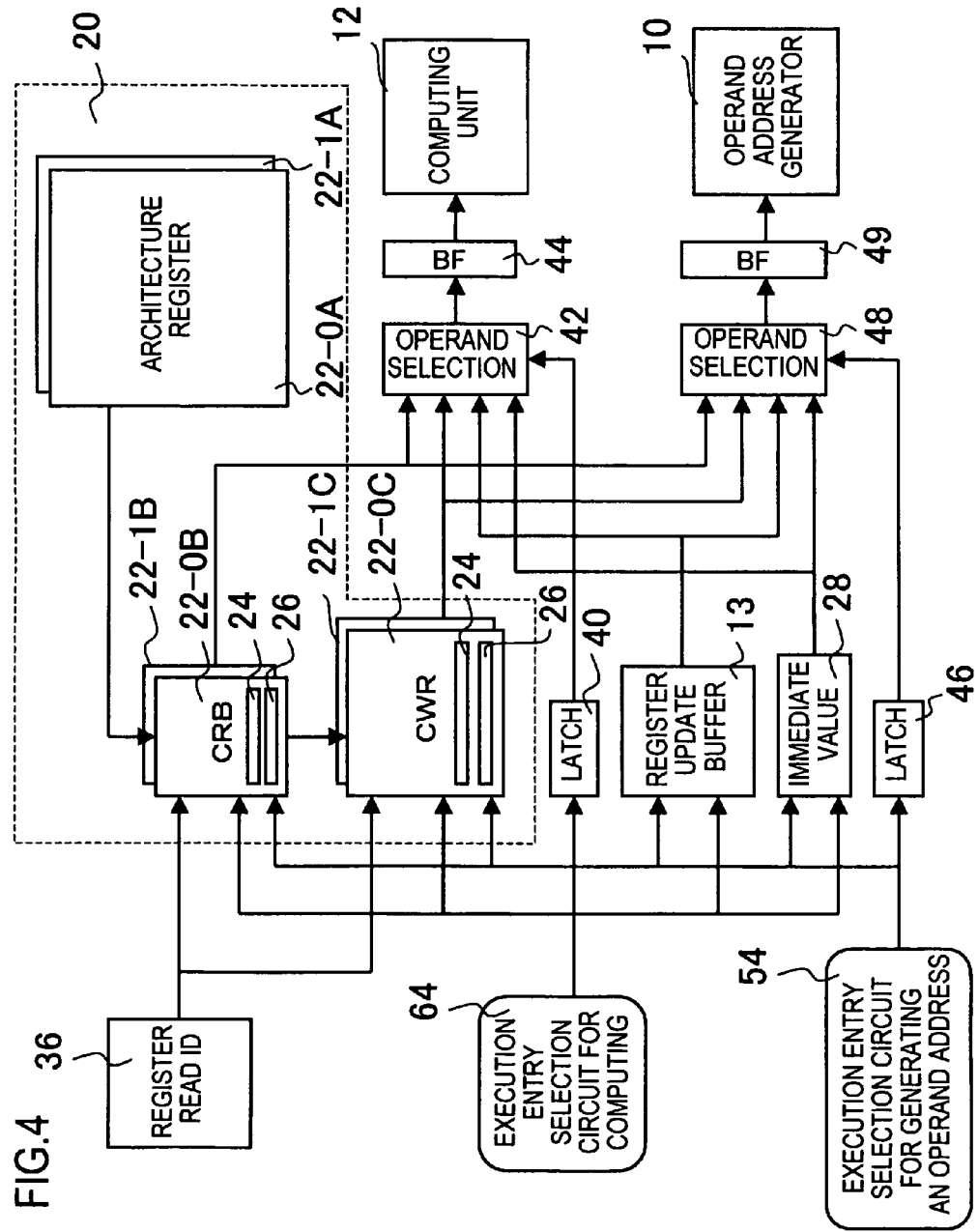
FIG. 4 is a block diagram depicting a register file of the instruction execution control device in FIG. 2.
Figure 5:
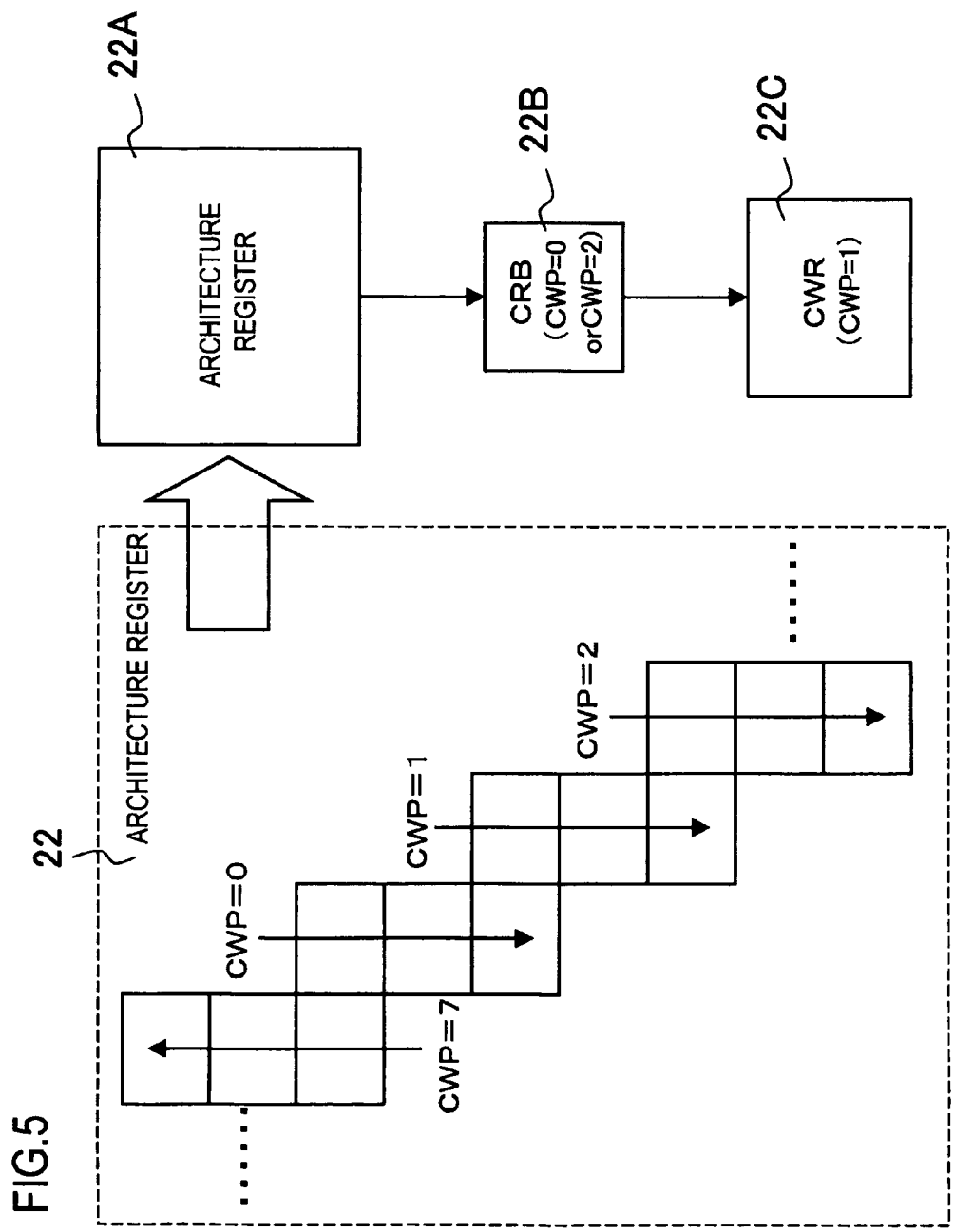
FIG. 5 is a diagram depicting the register file in FIG. 4.
Figure 6:
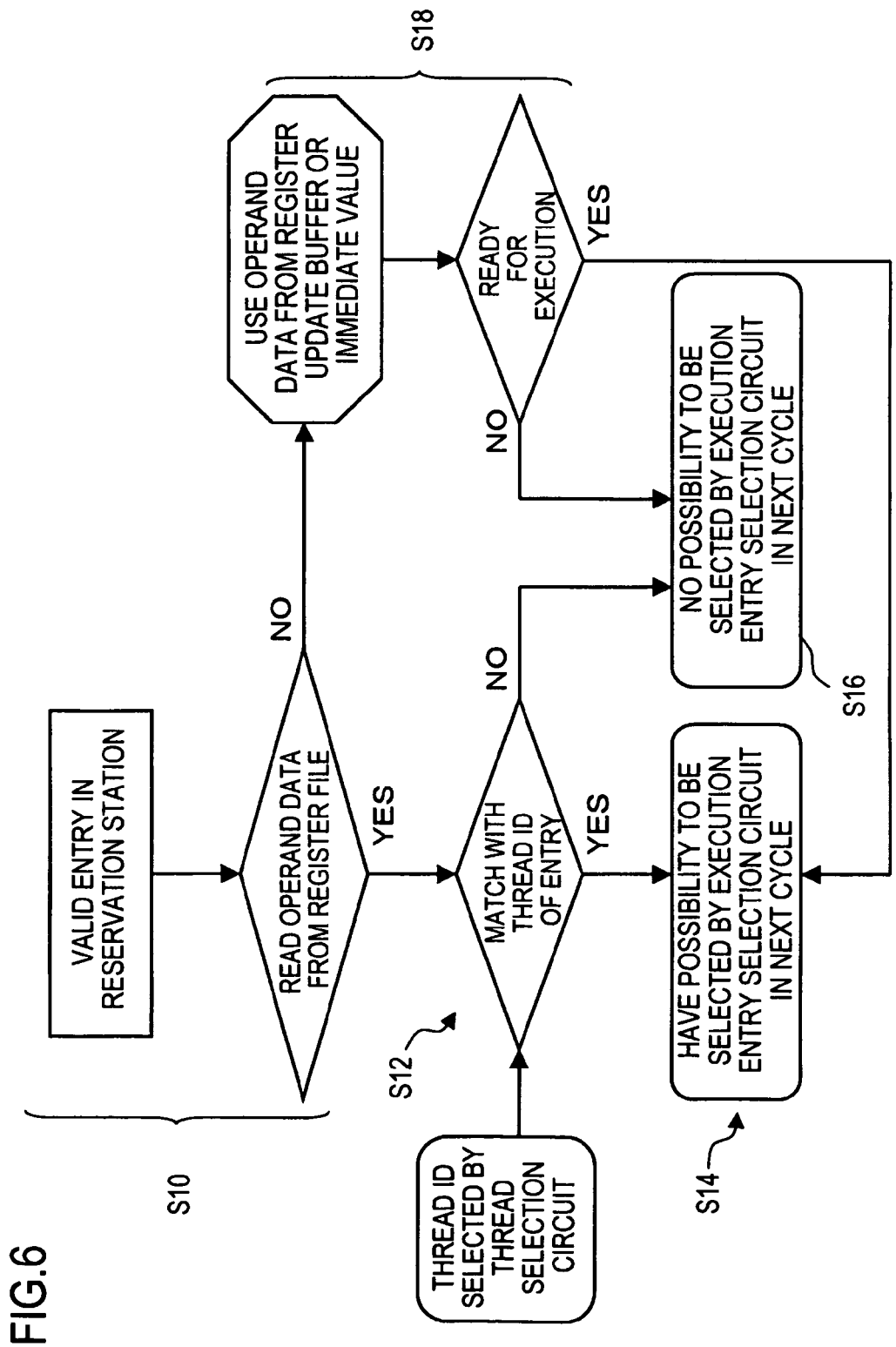
FIG. 6 is a flowchart depicting entry execution selection operation of the reservation station in FIG. 3.
Figure 7:
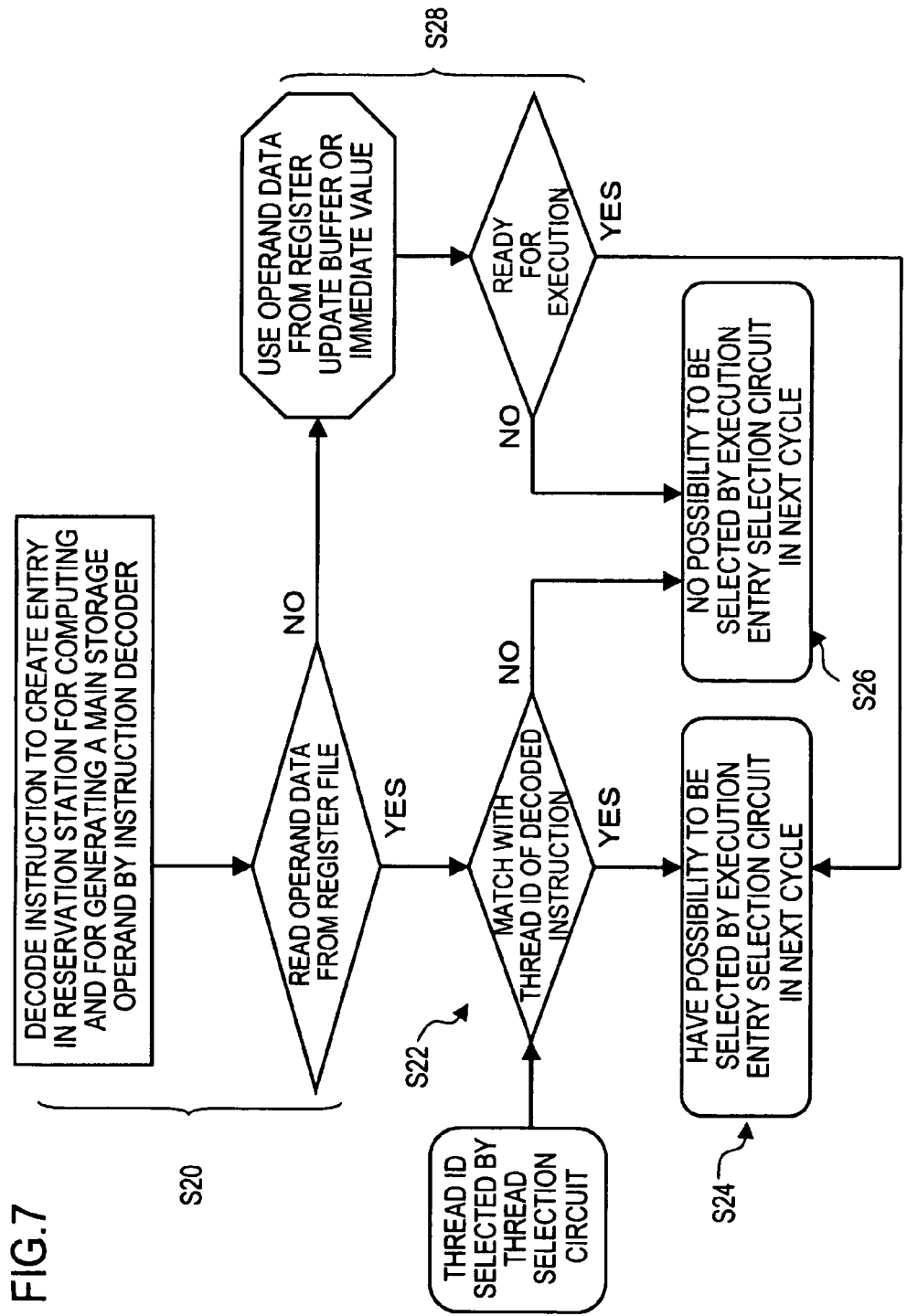
FIG. 7 is a flowchart depicting entry execution selection operation when registering the entry of the entry generation circuit in FIG. 3.

The instruction execution control device in FIG. 2 will be described in detail. FIG. 3 is a block diagram depicting the reservation station in FIG. 2, FIG. 4 is a block diagram depicting the register file and function execution circuit in FIG. 2, FIG. 5 is a diagram depicting the register file in FIG. 4, FIG. 6 is a diagram depicting entry execution selection operation of the reservation station in FIG. 3, and FIG. 7 is a diagram depicting the entry registration operation of the entry generation circuit in FIG. 3.

FIG. 3 to FIG. 7 depict blocks of the RSA5 and RSE6, excluding the reservation station unit for floating point 7 in FIG. 1. The reservation station unit for floating point 7 in FIG. 1 also has a similar configuration and separately has a similar register file. However the reservation station unit for floating point 7 does not equips the CWR and CRB, so the operand data required for executing a function is read from the register file of the architecture register (floating point register 17) to execute the function.

As FIG. 3 depicts, the reservation station unit for computing 6 has an entry generation circuit 60, a reservation station for computing 62 and an execution entry selection circuit 64.

In the same way, the reservation station unit for main storage operand generation 5 has an entry generation circuit 50, a reservation station for storage memory operand generation 52 and an execution entry selection circuit 54.

The thread selection circuit 32 receives a thread ID of an instruction decoded by the instruction decoder 4 and selects a thread and notifies the selected thread to the entry generation circuits 50 and 60, the reservation stations 52 and 62 and a register read ID buffer 36, as one thread selection method, as described later.

As described in FIG. 6, the reservation stations 52 and 62 receive the selected thread ID from the thread selection circuit 32 in each cycle in order to execute an out-of-order processing, and assigns priority to entries so that an entry, for which required operand data is ready, is executed with priority.

The execution entry selection circuit 54 or 64 selects an entry to be executed, out of the entries registered in the reservation station 52 or 62, and outputs it to the computing unit 12 or the like. When a plurality of entries are ready to be executed, then the execution entry selection circuit 54 or 64 selects and executes from an older entry of the entries.

In the same way, the entry generation circuit 60 receives the selected thread ID from the thread selection circuit 32 at a stage where an entry is registered in the reservation station 52 or 62, and assigns priority to entries so that an entry, of which required operand data is complete, is executed with priority, as described in FIG. 7.

In order to control this priority, the thread selection circuit 32 selects a thread one cycle before the execution entry selection circuit 54 or 64 selects an entry of the reservation station 52 or 62. This selection thread ID is sent to the register file 20 via the register read ID buffer 36, so a thread to be read in the register file 20 is determined in advance.

Therefore the architecture register 22-0 or 22-1 can be selected at an early stage before the execution entry is selected by the execution entry selection circuit 54 or 64.

The entry execution selection operation of the reservation station 52 or 62 will now be described with reference to FIG. 6. The reservation station 52 or 62 checks whether or not the registered valid entry is an entry for reading the operand data required for execution from the architecture register (S10).

If it is decided that this entry is an entry for reading operand data from the architecture register, it is judged whether or not the ID of this entry matches the ID of the thread selected by the thread selection circuit 32, which selects a thread to be read from the register file, in one previous cycle of the execution entry circuit 54 or 64 (S12).

If it is decided that this entry ID matches the ID of the selected thread in step S12, the entry is judged as an entry which has a possibility to be selected by the execution entry selection circuit 54 or 64 in the next cycle, and a "1" flag is assigned to this entry (S14).

If it is decided that this entry ID does not match the ID of the selected thread, then the entry is decided as an entry which has not possibility to be selected by the execution entry selection circuit 54 or 64 in the next cycle, and a "0" flag is assigned to this entry (S16).

If the entry is decided as an entry which the operand data required for execution is read from a register update buffer other than the architecture register, or if the entry is decided as an entry which uses an immediate value in step S10, the entry can be executed regardless the thread of the entry in the reservation station 52 or 62. Therefore the reservation station 52 or 62 judges whether or not the entry is ready for execution (S18).

If it is decided that the entry is ready for execution, this entry is decided as an entry which has a possibility to be selected by the execution entry selection circuit 54 or 64 in the next cycle, and a "1" flag is assigned to the entry (S14).

If it is decided that this entry is not ready for execution, then the entry is decided as an entry which has no possibility to be selected by the execution entry selection circuit 54 or 64 in the next cycle, and a "0" flag is assigned to this entry (S16).

In this way, it is judged whether or not the entry registered in the reservation station 52 or 62 is an entry for reading the operand data from the register file. And if it is decided that this entry is an entry for reading the operand data, it is checked whether or not this entry is an entry of the selected thread. And if it is decided as the entry of the selected thread, this entry is recognized as an entry which has a possibility to be selected to be executed in the next cycle.

Therefore this entry can be selected by the execution entry selection circuit 54 or 64, and executed in the next cycle. Thereby even if the architecture register is selected first using the thread ID, this entry matches the entry to be executed in the next cycle, and as a result, the simultaneous multi-thread system can be smoothly executed.

The register file can be selected more quickly when this prioritization is performed in multiple stages. For example, this prioritization is suitable for the current window system which is described in FIG. 4 and FIG. 8.

The prioritization operation by the entry generation circuit 50 or 60 will now be described with reference to FIG. 7. FIG. 7 is an entry selection operation in a cycle where an instruction is decoded and the entry generation circuit 50 or 60 registers a new entry in the reservation station 52 or 62. When the entry generation circuit 50 or 60 receives the instruction to create an entry the reservation station 52 or 62 from the instruction decoder 4, the entry generation circuit 50 or 60 checks whether or not the entry to be registered is an entry for reading operand data required for execution from the architecture register (S20).

If this entry is judged as an entry for reading operand data from the architecture register, it is judged whether or not the ID of this entry matches the ID of the thread selected by the thread selection circuit 32, which selects a thread to be read from the register file, in this cycle (S22).

If it is decided that this entry ID matches the ID of the selected thread in step S22, the entry is decided as an entry which has a possibility to be selected by the execution entry selection circuit 54 or 64 in the next cycle, and a "1" flag is assigned to this entry (S24).

If it is decided that this entry ID does not match the ID of the selected thread, then the entry is decided as an entry which has no possibility to be selected by the execution entry selection circuit 54 or 64 in the next cycle, and a "0" flag is assigned to this entry (S26).

If the entry is decided as an entry which reads the operand data required for execution from the register update buffer other than the architecture register, or if the entry is decided as an entry which uses an immediate value in step S20, the entry can be executed regardless the thread of the entry to be registered. Therefore the entry generation circuit 50 or 60 judges whether or not the entry is ready for execution (S28).

If it is decided that the entry is ready for execution, this entry is decided as an entry which has a possibility to be selected by the execution entry selection circuit 54 or 64 in the next cycle, and a "1" flag is assigned to the entry (S24).

If it is decided that this entry is not ready for execution, then the entry is decided as an entry which has no possibility to be selected by the execution entry selection circuit 54 or 64 in the next cycle, and a "0" flag is assigned to this entry (S26).

In this way, the entry generation circuit 50 or 60 checks whether or not the entry to be registered is an entry for reading the operand data from the register file in the entry registration cycle in the reservation station 52 or 62. And if this entry is decided as an entry for reading the operand data, the entry generation circuit 50 or 60 checks whether or not the entry is an entry of the selected thread. And if it is decided as the entry of the selected thread, this entry is recognized as an entry which has a possibility to be selected to be executed in the next cycle.

Therefore this entry can be selected by the execution entry selection circuit 54 or 64, and executed in the next cycle. Thereby even if the architecture register is selected first using the thread ID, this entry matches the entry to be executed in the next cycle, and as a result, the simultaneous multi-thread system can be smoothly executed.

Now the register configuration of the architecture register in the register file 20 in the out-of-order system will be described with reference to FIG. 5. The architecture register 22-0 or 22-1 installed for each thread is constructed by huge registers.

In these architecture registers, a portion of the register required for executing an instruction is limited to the portion indicated by the current window pointer (CWP), which is provided for each thread. So the portion of the register indicated by the current window pointer (CWP) is copied from the architecture register 22A, the copied portion is stored in the current window register (CWR) 22C.

In order to copy this portion from the architecture register 22A to CWR 22C, the portion is stored once from the architecture register 22A to the CWR replacement buffer (CRB) 22B, and is then stored in CWR 22C.

When the portion of the register of the current window pointer (CWP) is stored in CWR 22C, one portion of one register before and after the current window pointer (CWP) is also stored in CRB 22B. For example, in the case of the current window pointer CWP=1, three blocks of CWP=1 of the architecture register 22A are stored in CWR 22C, and CRB 22B stores the above two blocks of CWP=0, or below two blocks below of CWP=2, in the architecture register 22A.

CWR 22C and CRB 22B are provided for each thread, and are constructed by a register file which has only one thread that can be read at the same time, just like the architecture register 22A.

Reading operand data required from the architecture register 22 via the reservation station 5, 6 or 7 involves reading operand data from CWR 22C. While executing an instruction to change the current window pointer (e.g. SAVE and RESTORE instructions), the operand data may be read from CRB22B.

Using this register configuration for a huge architecture register can improve the throughput of data read, and decrease register amount in the out-of-order instruction execution system (e.g. see Japanese Patent Application Laid-Open No. 2007-87108).

FIG. 4 is a block diagram depicting the execution of functions based on operand data in this configuration example of the register file. In FIG. 4, composing elements the same as FIG. 2, FIG. 3 and FIG. 5 are denoted with a same symbol.

As FIG. 4 depicts, the register file 20 has architecture registers 22-0A and 22-1A provided for each thread, CRB22-0B and 22-1B provided for each thread, and CWR22-0C and 22-1C provided for each thread as depicted in FIG. 5. Each of CRB22-0B and 22-1B has a read thread selection circuit 24 and read operand data selection circuit 26. Each of CWR22-0C and 22-1C has a read thread selection circuit 24 and read operand data selection circuit 26.

A register read thread ID of the register read thread ID buffer 36 is sent to the respective read the thread selection circuit 24 of CRB22-0B and 22-1B, and CWR22-0C and 22-1C. A selection entry (including operand address) from the execution entry selection circuit 54 is sent to CRB22-0B, 22-1B, CWR22-0C and 22-1C, the register update buffer 13, the immediate value register 28 and a latch circuit 46 respectively.

A selection entry (including operand address) from the execution entry selection circuit 64 is sent to CRB22-0B, 22-1B, CWR22-0C, 22-1C, the register update buffer 13, the immediate value register 28 and a latch circuit 40 respectively.

For this, according to the register read ID and the entry selected by the execution entry selection circuit 54 or 64, the operand data is read from the CWR22-0C, 22-1C, CRB22-0B, 22-1B, the register update buffer 13 and the immediate value register 28. Out of these operand data, the operand selection circuit 42 or 48 selects the operand data required for executing a function, and sends the selected operand data to the computing unit 12 or operand address generator 10 via the latch circuit 44 or 49, so as to execute the function specified by the entry.

In this case as well, the thread ID is selected before the entry selection cycle. Since either CRB22-0B or CRB22-1B, and either CWR22-0C or 22-1C are selected by the thread ID in advance, the specified operand data can be read immediately if the entry is selected.

An address of the entry of the register update buffer 13 can be used when reading the operand data required for execution from this register update buffer 13. Hence the operand data of different threads can be read simultaneously.

Therefore when the entries of the reservation station 5 or 6 execute the entries including reading the operand data required for executing a function from the register update buffer 13, entries which are ready to be executed can be selected by the execution entry selection circuit 54 or 64 in each cycle, without being restricted by the thread ID which is read from the register file 22, just like the case of reading from the architecture register 22-0A (22-1A).

Now update processing of the architecture register by executing a function will be described with reference to FIG. 8. To execute functions by the computing unit 12 and the operand address generator 10, the operand data can be read from the register update buffer 13, or the immediate value register 28 is used, other than the architecture registers 22-0A and 22-1.

Figure 8:
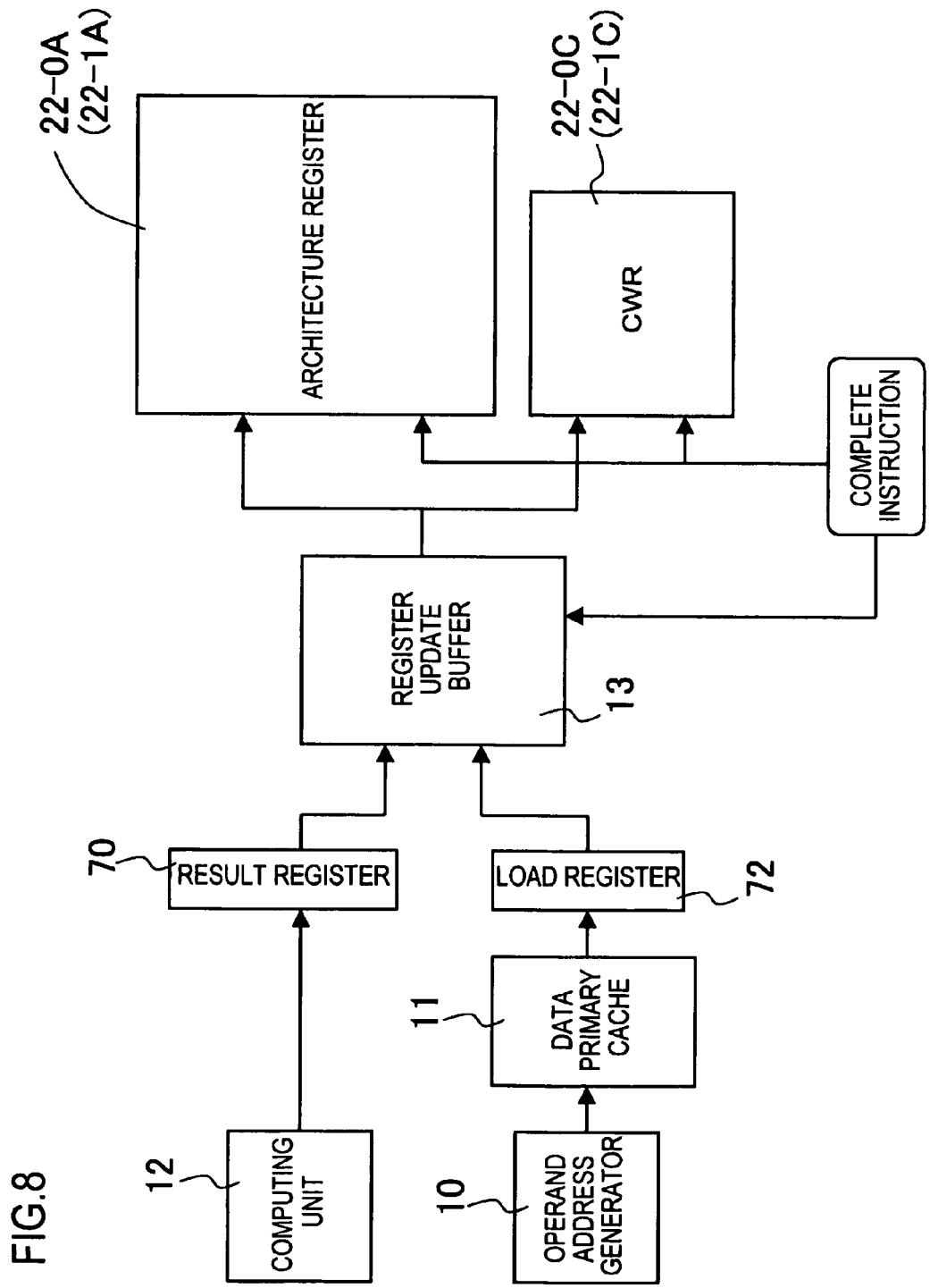
FIG. 8 is an explanatory diagram of updating operation of an architecture register executed by the instruction execution control device in FIG. 3.

As FIG. 8 depicts, the register update buffer 13 is a register which is not observed by a program, which stores data on the result of the execution of the function, and the entry can be shared and used by threads 0 and 1.

The execution result data written in the register update buffer 13 is held in the register update buffer 13 until the executed instruction is completed. When the instruction is completed (an instruction completion is transmitted from CSE9 in FIG. 1), the data is read from the register update buffer 13 and written to the architecture register 22-0A (22-1A) and CWR22-0C (22-1C).

For subsequent instructions, the functions can be executed by reading the operand data from the register update buffer 13 until the function execution result is written to the architecture register 22-0A (22-1A) (from execution to completion of the instruction).

(Thread Selection Circuit)

Figure 9:
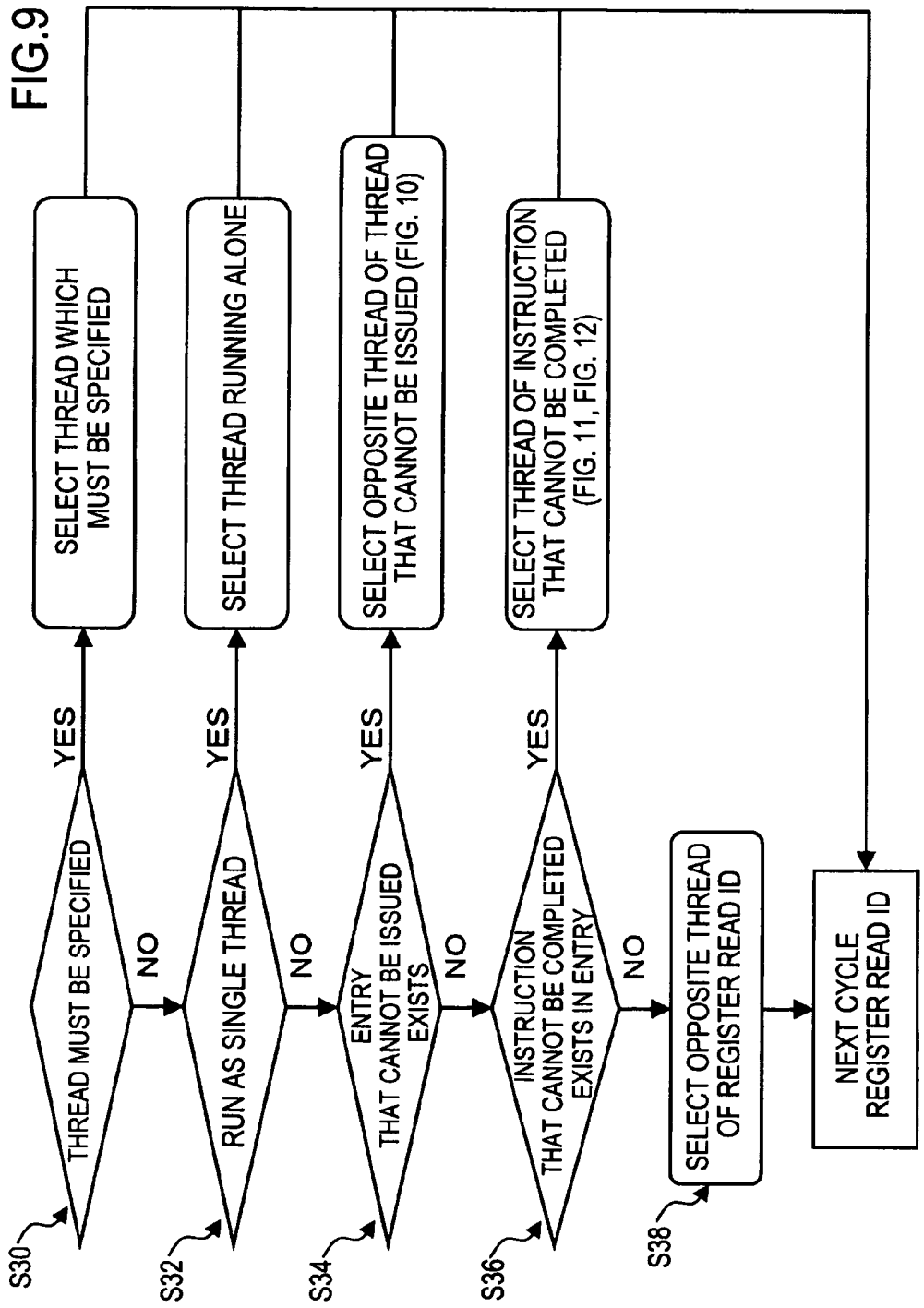
FIG. 9 is a flowchart depicting the thread selection operation of the thread selection circuit in FIG. 3.
Figure 10:
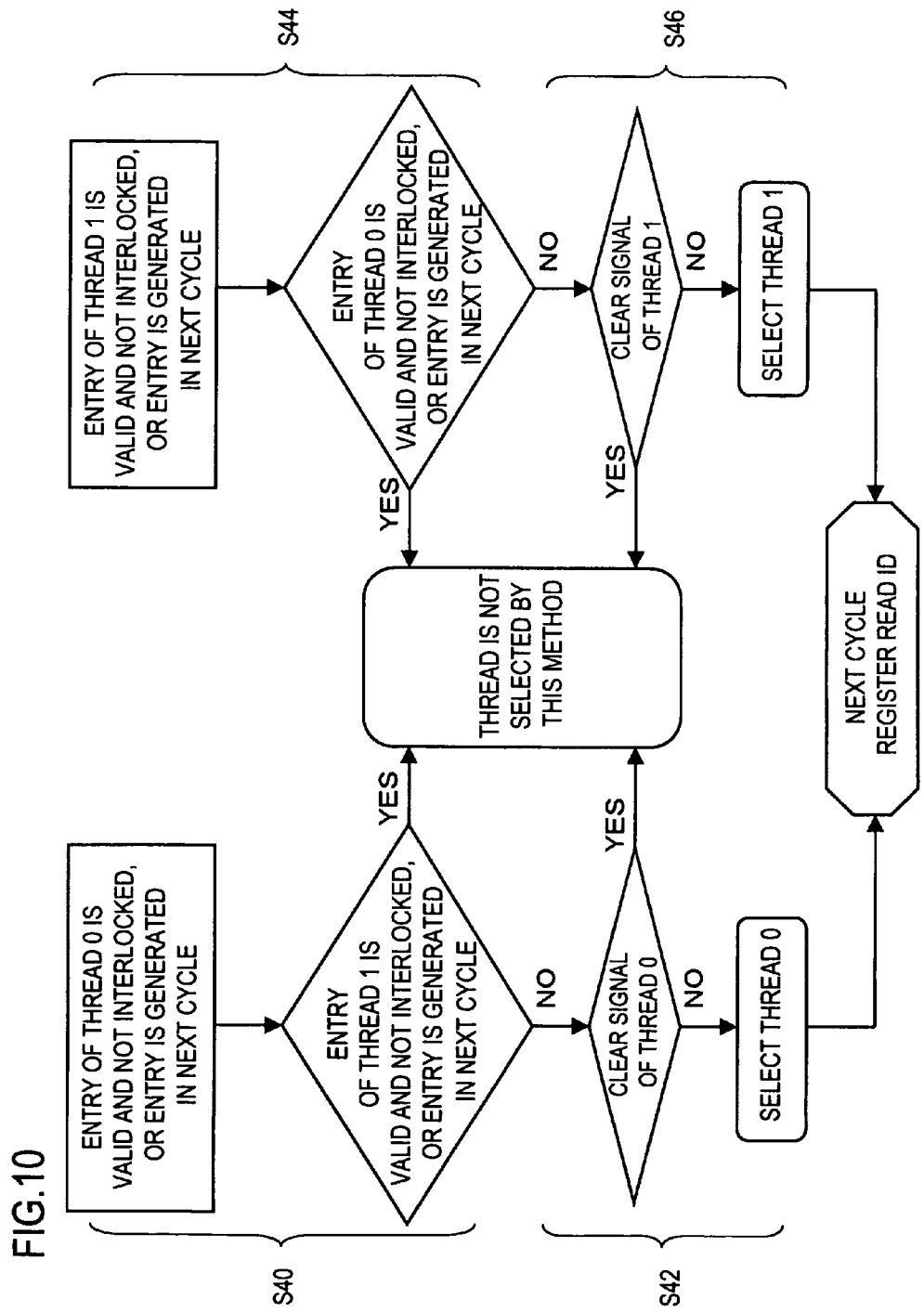
FIG. 10 is a flowchart depicting the thread selection operation in the entry operation in FIG. 9.
Figure 11:
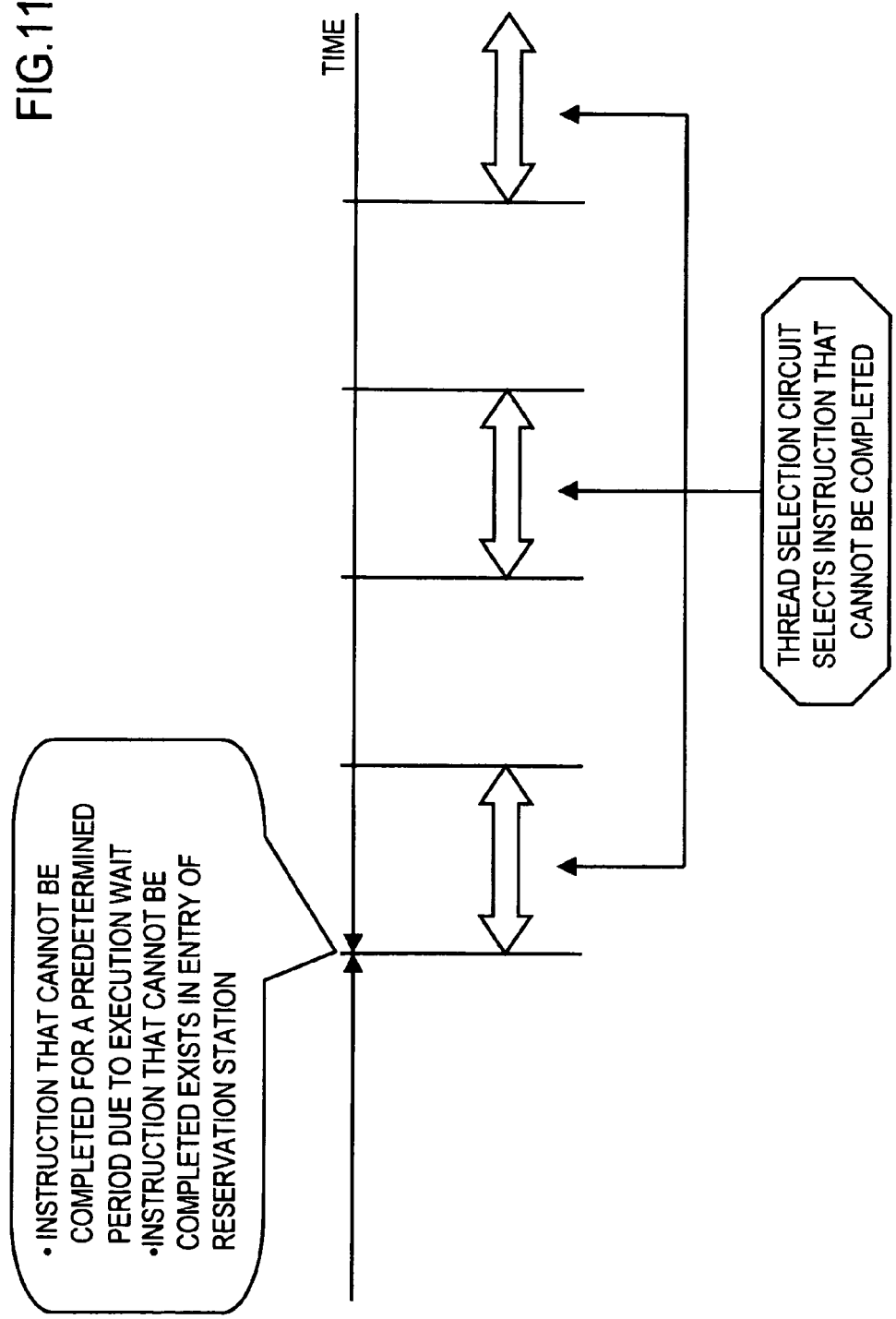
FIG. 11 is a diagram depicting the thread selection operation in the state of standby for execution to be completed in FIG. 9.
Figure 12:
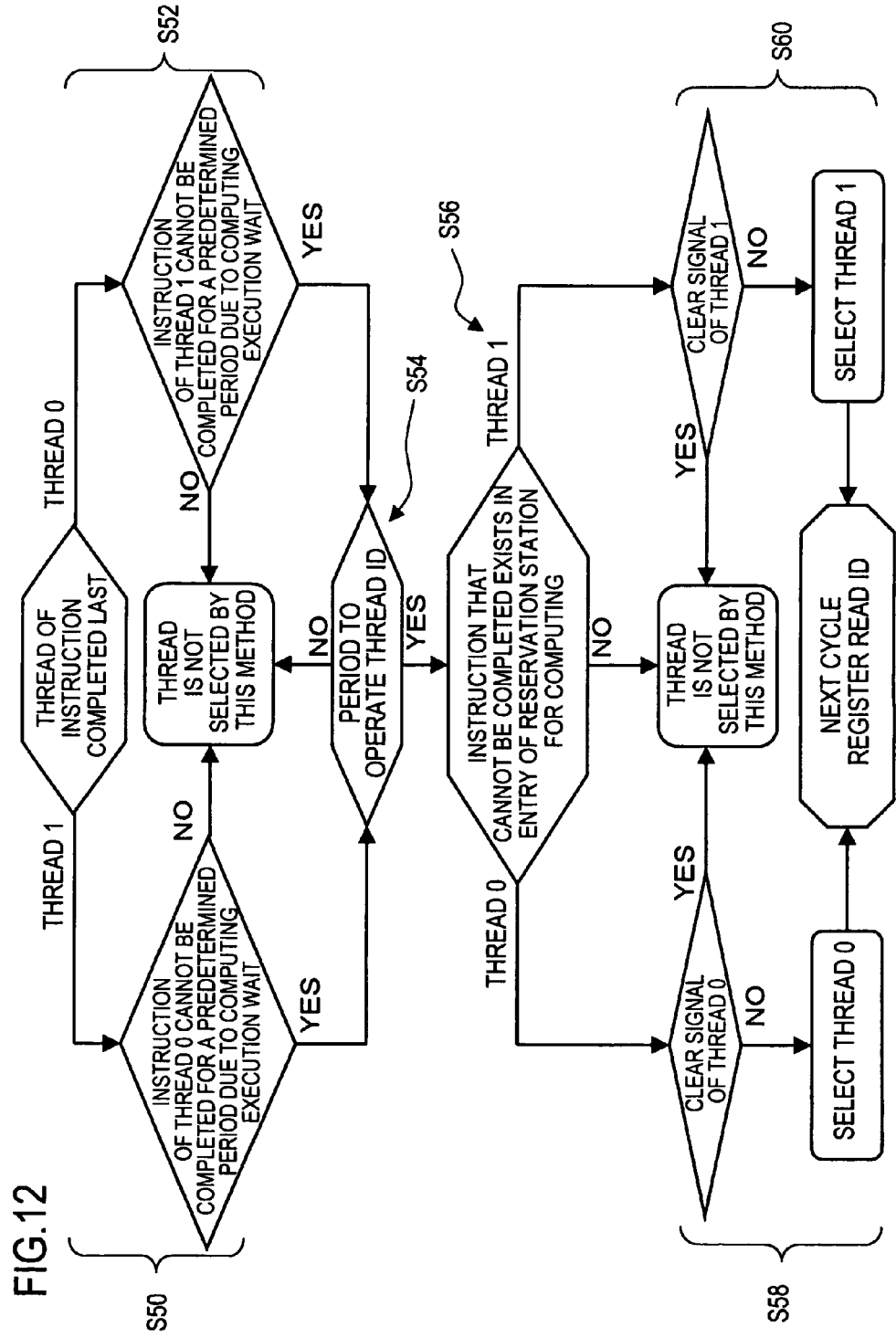
FIG. 12 is a flowchart depicting the thread selection operation in FIG. 11.

The thread selection circuit 32 to select the thread will now be described. FIG. 9 is a diagram depicting a thread selection method of the thread selection circuit 32, FIG. 10 is a diagram depicting the third selection method in FIG. 9, FIG. 11 and FIG. 12 are diagrams depicting the fourth selection method in FIG. 9, and FIG. 13 to FIG. 15 are circuit diagrams of the thread selection circuit 32.

As FIG. 9 depicts, there are four types of selection methods of the thread selection circuit 32 for a register read ID, and register read ID in the next cycle is determined according to these selection conditions. If the four types of selection conditions are not applicable, the opposite thread of the register read ID is selected for the register read ID in the next cycle (S38).

In the first selection method, it is judged whether or not a thread is specified (S30). The first selection method has highest priority in the thread selection circuit 32, and if a thread is specified, the thread selection circuit 32 always selects a thread to be specified. The case when the read thread of the register is specified is a case when the current window pointer is changed.

In other words, as described in FIG. 5, when a current window pointer is changed, the register portion indicating the changed current window pointer CWP of the thread and the pointers before and after the current window pointer are read from the architecture register 22A.

This data is written to CRB22B, and by reading it from the CRB22B, and then writing it to CWR22C, CWR22C with the new window pointer can be provided.

During transition processing of the register from the change of the current window pointer CWP to setting of the new window pointer, the thread, of which changed the current window pointer, has a priority in reading the architecture register 22A, the read and write of CRB22B, and the write to CWR22C. This means that a thread which can read and write the register file 22 is restricted to the thread of which changed the current window pointer.

Therefore during register transition processing, the thread which is executing the register transition processing and a thread selected by the thread selection circuit 32, which selects a thread to be read from the register file 22, will match. The register transition processing is controlled so that it can be processed only by one thread at the same time, and cannot be processed by two threads at the same time.

In this way, while the thread to read and write the register file 22 is restricted during the transition processing of the register, it is controlled such that the thread selection circuit 32 always selects a thread the same as the thread of the transition processing of the register. As a result, the entry which is executed by the reservation station and which reads an operand data from the architecture register 22 matches the thread in the transition processing of the register. In this way, the thread selection circuit 32 during the transition processing of the registers operates so as to restrictively select the thread in the transition processing of the register.

In the processing in the middle of execution of the instruction to change the current window pointer CWP, the reservation station may read the operand data from CRB22B, when the operand data is to read from the architecture register, until the current window pointer CWP is changed.

At this time, the thread selection circuit 32 selects the thread which is changing the current window pointer, so that the operand data is not read from CRB22B during execution of an instruction to change the current window pointer from the reservation station when the opposite thread changes the current window pointer and the thread to read and write CRB22B and CWR22C restricts the current window pointer CWP.

There are three thread selection methods when a thread is not limited to a specific thread. A first selection method when a thread is not limited to a specific thread (second selection method) is that the thread selection circuit 32 selects an operating thread when the operating thread is a single thread (S32).

A second selection method when a thread is not limited to a specific thread (third selection method) is to select an opposite thread of a thread which cannot be issued when such an entry, which cannot be issued, exists (S34). In other words, if at least one entry which is ready to be executed, exists in the entries of the reservation stations 52 and 62 for computing and for generating a main storage operation address, and no entries in the opposite thread are ready to be executed, the thread where at least one entry can be executed, is selected.

The third selection method will now be described in detail with reference to FIG. 10.

The state in which the entry of the reservation station 52 or 62 can be executed is a state in which an entry in each thread is valid and is not interlocked, or in which an entry is null but an entry has a possibility to become valid in the next cycle.

In an entry of the reservation station 52 or 62, information for controlling not to execute the entry (interlock function), even if the entry can be ready to be executed, is provided as a signal of the entry.

Once this signal is set, this entry is not selected by the execution entry selection circuit 54 or 64, and cannot be executed, but after reset, this entry can be executed and can be selected by the execution entry selection circuit 54 or 64.

When detecting a state where the entry of the thread 0 is valid and is not interlocked, or a state where the entry is null but the entry has a possibility to become valid in the next cycle, it is judged whether or not the entry in the thread 1 is valid and is not interlocked or the entry has a possibility to become valid in the next cycle, even if the entry is null (S40). If the entry of the thread 1 is valid and is not interlocked, or if the entry has a possibility to become valid (YES), the thread selection based on the third selection method is not executed.

Next, if the entry of the thread 1 is not valid and is interlocked, or if the entry has no possibility to become valid (NO), then it is judged whether or not a signal to clear all the entries of the thread was issued to the thread 0. And if the signal to clear all the entries was issued to the thread 0, thread selection is not executed in this selection circuit (S42). If the clear signal was not issued to the thread 0, the thread 0 is selected.

Whereas if it is detected that the entry of the thread 1 is valid and is not interlocked, or the entry is null but the entry has a possibility to become valid in the next cycle, it is judged whether or not the entry of the thread 0 is valid and is not interlocked, or the entry has a possibility to become valid even if the entry is null (S42). If the entry of the thread 0 is valid and is not interlocked, or if the entry has a possibility to become valid (YES), the thread selection based on the third selection method is not executed.

If the entry of the thread 0 is not valid and is interlocked, or if the entry has no possibility to become valid (NO), then it is judged whether or not a signal to clear all the entries of the thread was issued to the thread 1. And if the signal to clear all the entries was issued to the thread 1, this selection circuit does not select a thread (S46). If the clear signal was not issued to the thread 1, the thread 1 is selected.

Referring again to FIG. 9, according to the third selection method used when the thread is not limited to a specific thread (called as fourth selection method), if an instruction which is in a state of standby for execution and cannot be completed for a predetermined period, is detected, and if the instruction which cannot be completed exists in an entry of the reservation station as depicted in FIG. 11, the thread of the instruction which cannot be completed in the current state is selected by the thread selection circuit 32 at a predetermined interval (S36). This selection circuit is effective when two threads are operating.

This will be described in detail with reference to FIG. 12. It is detected whether or not the opposite thread of the thread of the instruction completed the last time is in a state where no instruction can be completed for a predetermined period (S50, S52). If not detecting in this state (NO), the thread selection by this method is not executed.

If in this state (YES), it is judged whether or not this is during the later mentioned thread ID operation period, and if not during the operation period, the thread selection in this method is not executed (S54).

If during the operation period, it is judged whether or not an entry in the reservation station, of which the instruction identifier of the valid entry in the reservation station for computing matches the instruction identifier of the instruction which cannot be completed in the current state, exists (S56).

If exists this entry, the thread of the instruction, which cannot be completed unless a clear signal is issued, is selected by the thread selection circuit (S58, S60).

In this state, the thread is selected by the thread selection circuit at a predetermined interval as depicted in FIG. 11. The thread selection circuit 32 selects a thread during the thread selection period, and does not select a thread if it is not the thread selection period (S54).

If a signal to clear all the entries of a thread for separated all thread is issued, the thread selection by this selection circuit is not executed for this thread, to which the clear signal was issued (S58, S60).

Figure 14:
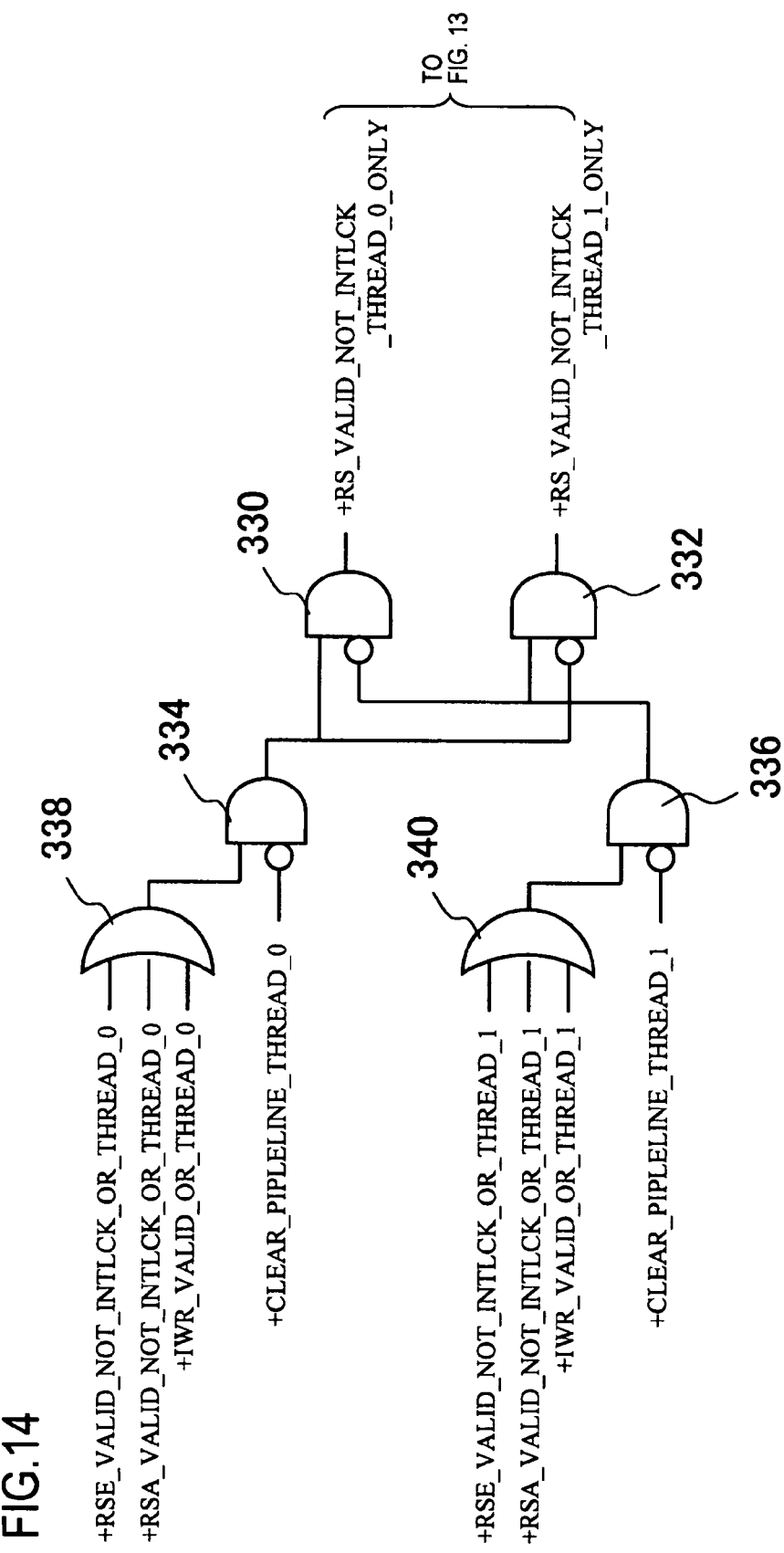
FIG. 14 is a circuit diagram of the thread selection circuit for the third selection method in FIG. 9.
Figure 15:
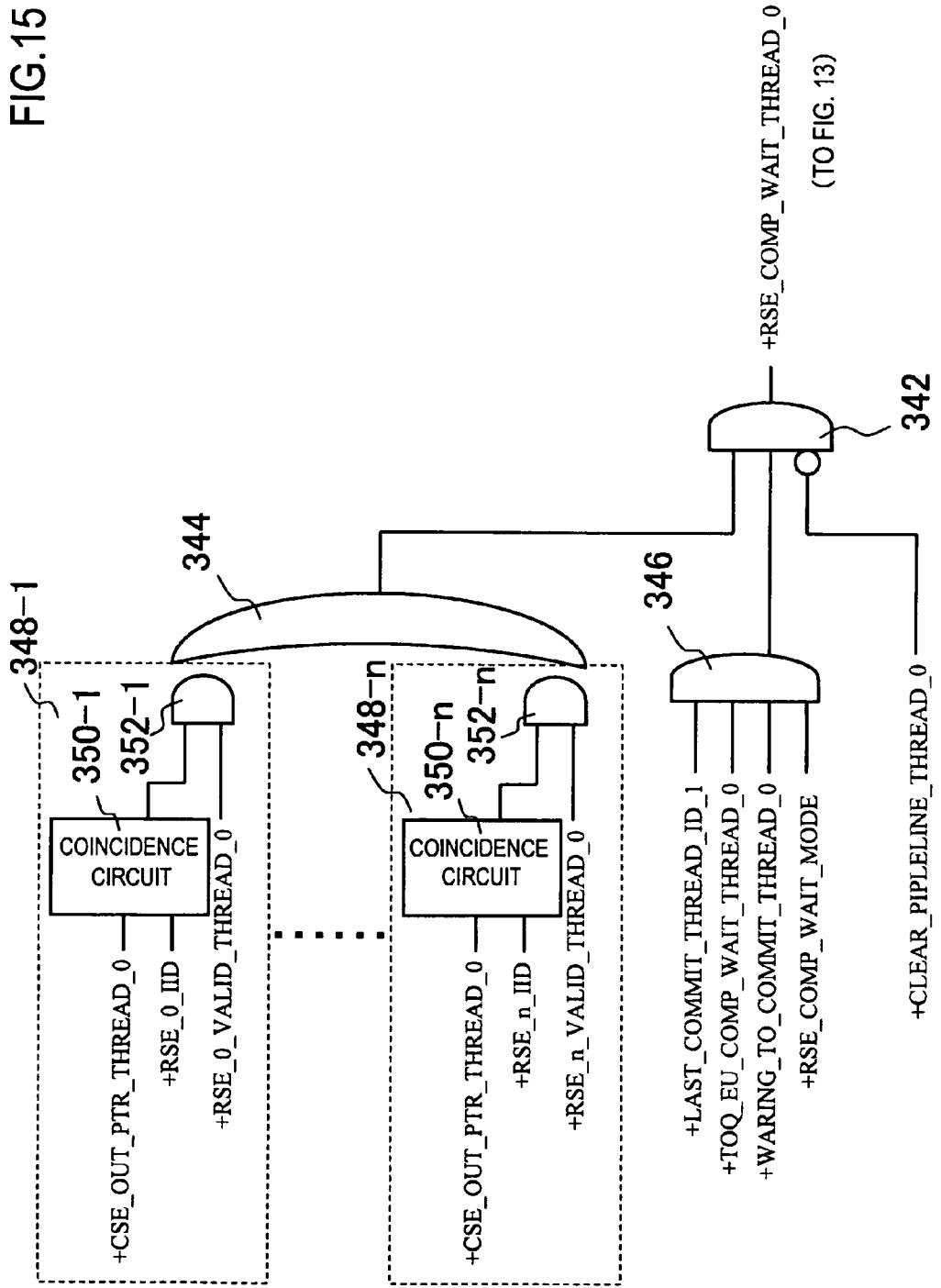
FIG. 15 is a circuit diagram of the thread selection circuit for the fourth selection method in FIG. 9.
Figure 16:
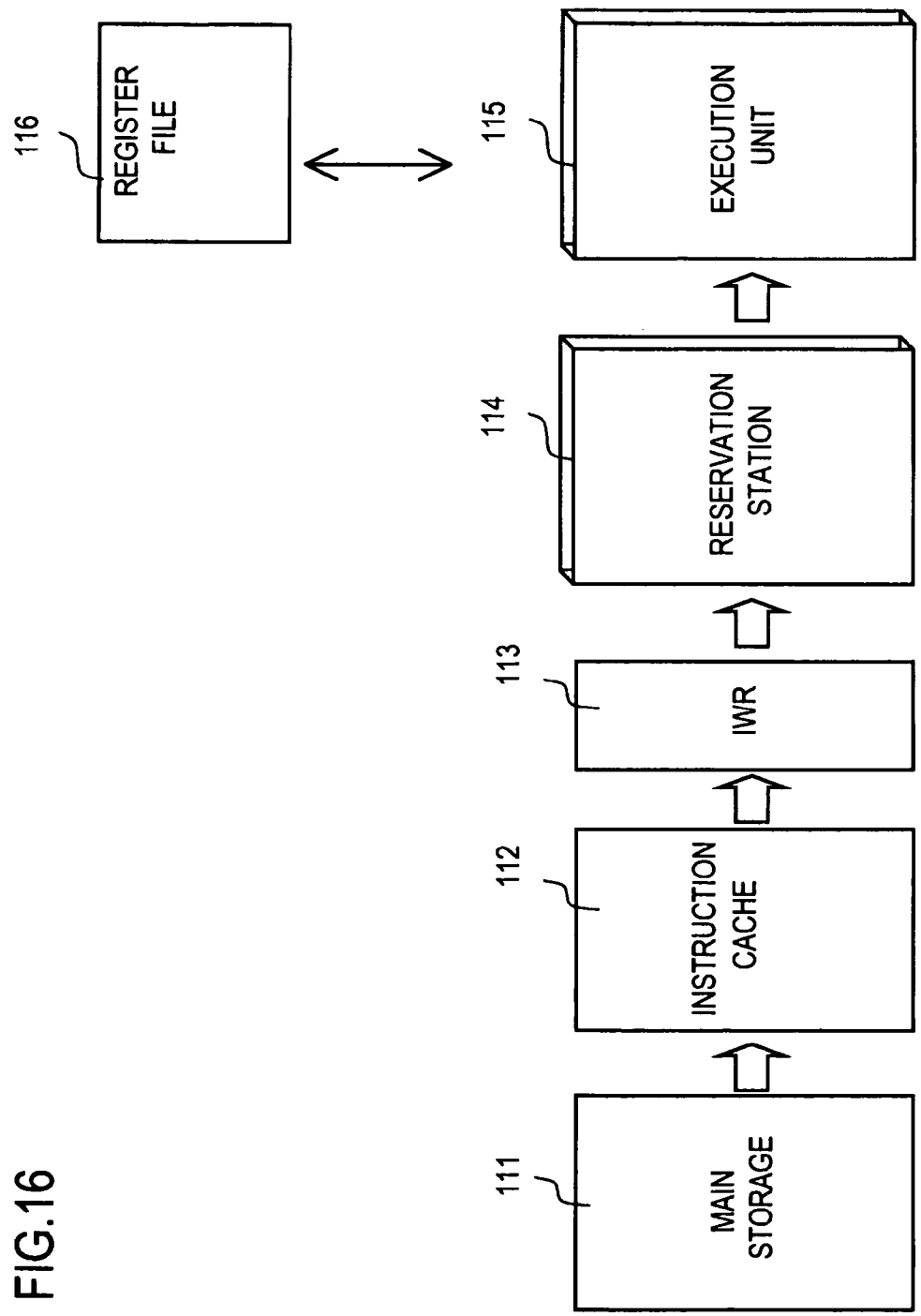
FIG. 16 is a block diagram of the conventional instruction execution control device.

This thread selection circuit 32 is constructed by logical circuits. The circuit in FIG. 15 is a circuit to implement the fourth selection method, and the output thereof becomes input to the circuit in FIG. 14. The circuit in FIG. 14 is a circuit to implement the third selection method, and the output thereof becomes input to the circuit in FIG. 13. The circuit in FIG. 13 is a circuit to implement the first and second selection methods, and to output the final thread selection ID (THREAD_ID).

Figure 13:
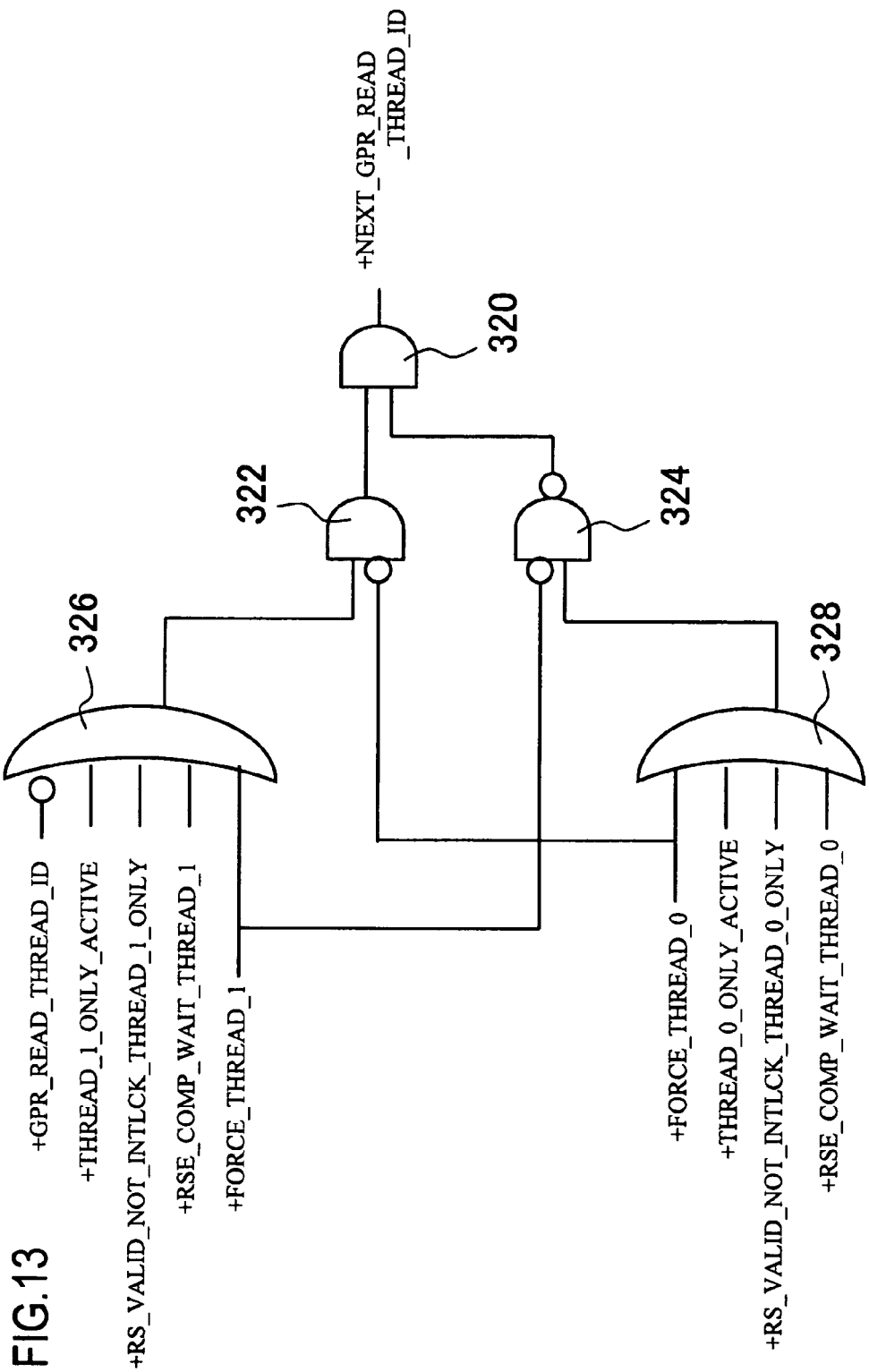
FIG. 13 is a circuit diagram of the thread selection circuit for the first and second selection methods in FIG. 9.

The circuit in the final stage in FIG. 13 has an output AND gate 320, one input inversion type AND gate 322, one input inversion and output inversion type AND gate 324, and a pair of OR gates 326 and 328.

In FIG. 13, +FORCE_THREAD_0 or +FORCE_THREAD_1 is a signal which indicates that the register is in transition processing, and indicates the case of requiring to specify a thread. When this signal is ON, the selection circuit 32, by using the outputs of the OR gates 326 and 328 and this signal, selects a thread which is turned ON by the AND gate 322 or 324. In other words, the first selection method described in step S30 in FIG. 9 is executed. These two signals are not turned ON at the same time.

In FIG. 13, +THREAD_0_ONLY_ACTIVE or +THREAD_1_ONLY_ACTIVE is a signal to indicate a thread which is operating in a single thread operation. These two signals are not turned ON at the same time. When this signal is turned ON, the thread selection circuit 32 selects a thread which is turned ON by the OR gates 326 and 328 and AND gate 322 or 324. The second selection method in step S32 in FIG. 9 is therefore executed.

In the circuit in FIG. 13, +RS_VALID_NOT_INTLCK_THREAD_0_ONLY signal and +RS_VALID_NOT_INTLCK_THREAD_1_ONLY signal are output by the third selection method in FIG. 14, and +RSE_COMP_WAIT_THREAD_0 and +RSE_COMP_WAIT_THREAD_1 are output by the fourth selection method in FIG. 15.

The circuit to implement the third selection method in FIG. 14 has a pair of one input inversion type AND gates 330 and 332, a pair of one input inversion type AND gates 334 and 336, and a pair of OR gates 338 and 340.

In FIG. 14, +RSE_VALID_NOT_INTLCK_OR_THREAD_0 is a signal to indicate that there is at least one valid entry of thread 0 which is not interlocked in the entries of the reservation station for computing.

+RSA_VALID_NOT_INTLCK_OR_THREAD_0 is a signal to indicate that there is at least one valid entry of the thread 0 which is not interlocked in the entries of the reservation station for generating the main storage operand address.

+IWR_VALID_OR_THREAD_0 is a signal to indicate that the instruction of the thread 0 is decoded by the instruction decoder. If one of these signals is ON, it means that an entry which is ready for execution from the OR gate 338 exists in the entries of thread 0 of the reservation station.

When this signal of the thread 1 from the OR gate 340 is OFF and the signal +CLEAR_PIPELINE_THREAD_0, to clear the entries of the thread 0, is OFF, +RS_VALID+NOT_INTLCK_THREAD_0_ONLY is output from the AND gate 330 via the AND gate 334, and is input to the OR gate 328 in FIG. 13. Therefore the circuit in FIG. 13 selects the thread 0.

The same circuit configuration is used to select the thread 1. In other words, +RSE_VALID_NOT_INTLCK_OR_THREAD_1 is a signal to indicate that there is at least one valid entry of the thread 1 which is not interlocked in the entries of the reservation for computing.

+RSA_VALID_NOT_INTLCK_OR_THREAD_1 is a signal to indicate that there is at least one entry of the thread 1 which is not interlocked in the entries of the reservation station for generating a main storage operand address.

+IWR_VALID_OR_THREAD_1 is a signal to indicate that the instruction of the thread 1 is decoded by the instruction decoder. If one of these signals is ON, it means that an entry which is ready for execution from the OR gate 340 exists in the entries of the thread 1 of the reservation station.

When this signal of the thread 0 from the OR gate 338 is OFF and the signal +CLEAR_PIPELINE_THREAD_1, to clear the entries of the thread 1, is OFF, +RS_VALID_NOT_INTLCK_THREAD_1_ONLY is output from the AND gate 332 via the AND gate 336, and is input to the OR gate 326 in FIG. 13. Therefore the circuit in FIG. 13 selects the thread 1.

FIG. 15 depicts a circuit to select the thread 0 to implement the fourth selection method. The circuit in FIG. 15 has entry existence detection circuits 348-1 to 348-n, OR gate 344, AND gate 346 and one input inversion type AND gate 342.

The entry existence detection circuit 348-1 has a coincidence circuit 350-1 which detects the matching of the signal +CSE_OUT_PTR_THREAD_0 to indicate an instruction identifier of an instruction which will complete next, and the signal +RSE_0_IID to indicate an instruction identifier of a No. 0 entry of the reservation station for computing, and AND gates 352-1 to execute AND operation of a signal +RSE_0_VALID_THREAD_0 to indicate that the No. 0 entry of the reservation station for computing is valid in the thread 0, and the output of the coincidence circuit 350-1.

Therefore if the output of the entry existence detection circuit 348-1 is ON, it means that the first instruction of the thread 0 exists in the reservation station for computing. This existence detection circuit 348-1 is provided in a number corresponding to n number of entries of the reservation station for computing respectively, and if one of the entries establishes by the OR gate 344, a signal to indicate the existence in the reservation station for computing is output by the first instruction of the thread 0.

In the AND gate 346, a signal +LAST_COMMIT_THREAD_ID_1 to indicate that the thread of the instruction which completed the last time is the thread 1, a signal +TOQ_EU_COMP_WAIT_THREAD_0 to indicate that the first instruction is in computing wait state, a signal +WARNING_TO_COMIT_THREAD_0 to indicate that the instruction of the thread 0 is not completed for a predetermined period, and a signal +RSE_COMP_WAIT_MODE to indicate that this is a period selected by the thread selection circuit have been input.

When all of these input signals are ON, and the +CLEAR_PIPELINE_THREAD_0, which is a signal to clear, is OFF, if the signal that the first instruction of the thread 0 from the OR gate 344 exists in the reservation station for computing is output, the +RSE_COMP_WAIT_THREAD_0 signal is asserted from the AND gate 342.

This signal is input to the OR gate 328 in FIG. 13, and selects the thread 0 in the circuit in FIG. 13.

FIG. 15 depicts only the selection circuit of the thread 0, but the selection circuit to select the thread 1 is also the same circuit.

Further, if there is no thread which is selected by any of the above mentioned four types of patterns, the thread opposite the thread indicated by the register read ID has the register read ID in the next cycle, since two threads operate simultaneously, as described in step S38 in FIG. 9.

In the circuit in FIG. 13, the signal with opposite polarity of the signal +GPR_READ_THREAD_ID to indicate the register read ID is input to the OR gate 326, which determines the OR with the logic to select the thread 1 side, whereby if all the above mentioned conditions are not established, the next cycle register read ID can select the opposite thread of the register read ID.

Other Embodiments

In the above mentioned embodiments, the simultaneous multi-thread system in which two threads (threads 0 and 1) simultaneously operate was described, but the present invention can be applied to the system in which three or more threads operate simultaneously. The architecture register was described using a divided register configuration based on the current window pointer in FIG. 5, but can also be applied to other configurations.

The present invention was described above using the embodiments, but the present invention can be modified in various ways within the scope of the spirit of the present invention, and these variant forms shall not be excluded from the scope of the present invention.

INDUSTRIAL APPLICABILITY

When a plurality of threads are operated by the simultaneous multi-thread system, an architecture register is provided for each thread, and a thread to be read from the register file is selected in advance when reading the operand data required for execution of the function from the register file, so the architecture register can be selected at an early stage. The number of circuits in a portion for selecting the architecture registers increases, but the wiring amount of circuits can be decreased, because the architecture register of the thread to be read is selected in advance.

When reading the operand data from a location other than the architecture registers by the entry of the reservation station, all the threads can be simultaneously read, unlike the case of reading from an architecture register, without restrictions by the threads which are read simultaneously.

The invention claimed is:
1. An instruction execution control device, comprising:
a reservation station which controls a computing processing and a main storage operand address generation for processing out-of-order execution;
a register update buffer which stores data acquired by execution of a function;
a register file comprising an architecture register for each thread, and a read thread selection circuit for limiting a number of threads that can be read simultaneously, to a number of threads less than a number of threads of the architecture registers, so that a plurality of threads operate in a simultaneous multi-thread system; and
a thread selection circuit which, when reading an operand data from the register file by executing an entry in the reservation station, selects a read thread of the entry before the entry is executed and controls the read thread selection circuit,
wherein the operand data is read from an architecture register of the read thread selected by the thread selection circuit when the entry is computed or the operand generation is executed, and
the operand data in the register update buffer is stored in the architecture register when data acquired by executing an instruction by the entry in the reservation station is stored in the register update buffer and an instruction executed by the reservation station is completed.

2. The instruction execution control device according to claim 1, when the operand data required for computing and generating the operand address is read from the register update buffer or from an immediate value, the reservation station does not limit the number of threads that can be read simultaneously.

3. The instruction execution control device according to claim 1, the reservation station judges whether or not an entry in the reservation station requires to read the operand data from the register file and judges whether or not the thread of the entry matches the read thread of the entry selected by the thread selection circuit, and selects, for the execution, an entry which requires to read data from the register file and of which the thread of the entry matches with the thread of the entry selected by the thread selection circuit.

4. The instruction execution control device according to claim 3, the reservation station selects, based on the judgment, an entry which can read operand data required for execution of a function from the register update buffer or can use an immediate value, as an entry to be executed regardless the thread of the entry.

5. The instruction execution control device according to claim 1, the thread selection circuit detects that a thread that can be read from the register file is limited to a specific thread, and selects the specific thread.

6. The instruction execution control device according to claim 5, the thread selection circuit detects that a thread that can be read from the register file need not be limited to a specific thread, and prohibits selecting a thread which is not operating, using a signal to indicate a thread which is operating.

7. The instruction execution control device according to claim 5, the thread selection circuit detects that a thread that can be read from the register file need not be limited to a specific thread, and judges whether or not a thread in operation which cannot execute any of entries in the reservation station exists,
and the thread selection circuit, when it is decided that the thread exists, and when another thread in operation which can issue an entry exists, prohibits the thread selection of the thread that exists.

8. The instruction execution control device according to claim 5, the thread selection circuit detects that a thread that can be read from the register file need not be limited to a specific thread, and judges whether or not an instruction which cannot be completed for a predetermined period exists in entries in the reservation station,
and the thread selection circuit, if it is decided that the entry exists, selects the entry of the thread of the instruction which is not completed at a predetermined interval.

9. The instruction execution control device according to claim 5, the thread selection circuit detects that a thread that can be read from the register file need not be limited to a specific thread, and selects a thread for which the time when this thread is not selected by the thread selection circuit, is longest.

10. An instruction execution control method, comprising:
controlling a computing unit and a main storage operand generator to process an out-of-order execution, using a reservation station;
storing data acquired by the execution to a register update buffer;
selecting a read thread of an entry of the reservation station before executing the entry when operand data is read from the register file by executing the entry;
selecting a register file having an architecture register for each thread of a simultaneous multi-thread system and a read thread selection circuit for limiting a number of threads that can be read simultaneously to a number of threads less than a number of threads of the architecture registers using the read thread;
reading an operand data from the architecture register of the read thread selected by the thread selection circuit when the entry is computed or operand generation is executed; and
storing the operand data of the register update buffer in the architecture register when storing the data acquired by executing an instruction by the entry in the register update buffer and completing the instruction of the entry.

11. The instruction execution control method according to claim 10, further comprising prohibiting the limitation of the number of threads that can be read simultaneously when reading the operand data required for computing and generating an operand address from the register update buffer or from an immediate value.

12. The instruction execution control method according to claim 10, the controlling step comprises:
judging whether or not an entry in the reservation station is required to read the operand data from the register file;
judging whether or not the thread of the entry matches the read thread of the entry selected by the thread selection circuit; and
selecting, for the execution, an entry which is required to read data and of which the thread of the entry matches with the thread of the entry selected by the thread selection circuit.

13. The instruction execution control method according to claim 12, the controlling comprises selecting an entry which can read operand data required for execution of a function from the register update buffer or can use an immediate value, as an entry to be executed regardless the thread of the entry based on the judgment.

14. The instruction execution control method according to claim 10, the selecting comprises detecting that a thread that can be read from the register file is limited to a specific thread, and selecting the specific thread.

15. The instruction execution control method according to claim 14, the selecting further comprises detecting that a thread that can be read from the register file need not be limited to a specific thread, and prohibiting to select a thread which is not operating, using a signal to indicate a thread which is operating.

16. The instruction execution control method according to claim 14, the selecting further comprises:
detecting that a thread that can be read from the register file need not be limited to a specific thread, and judging whether or not a thread in operation which cannot execute any of entries in the reservation station exists; and
prohibiting to select the thread that exists if it is decided that the thread exists and if another thread in operation which can issue an entry exists.

17. The instruction execution control method according to claim 14, the selecting further comprises:
detecting that a thread that can be read from the register file need not be limited to a specific thread, and judging whether or not an instruction which cannot be completed for a predetermined period exists in entries in the reservation station; and
selecting the entry of the thread of the instruction which is not completed at a predetermined interval if it is decided that the entry exists.

18. The instruction execution control method according to claim 14, the selecting further comprises detecting that a thread that can be read from the register file need not be limited to a specific thread, and selecting a thread for which the time when this thread is not selected by the thread selection circuit is longest.

* * * * *